United States Patent [19]
Tsuru et al.

[11] Patent Number: 5,707,116
[45] Date of Patent: Jan. 13, 1998

[54] BRAKE FLUID PRESSURE CONTROL DEVICE WITH SEALED FLUID STORAGE CHAMBER

[75] Inventors: Naohiko Tsuru, Handa; Hideaki Suzuki, Kariya; Takayuki Nagai, Nagoya; Syuichi Yonemura, Anjou, all of Japan

[73] Assignee: Nippondenso Co., Ltd., Kariya, Japan

[21] Appl. No.: 572,670

[22] Filed: Dec. 14, 1995

[30] Foreign Application Priority Data

Dec. 28, 1994 [JP] Japan .................... 6-327616
Oct. 13, 1995 [JP] Japan .................... 7-265686

[51] Int. Cl.$^6$ ............................................. B60T 8/48
[52] U.S. Cl. ................................ 303/116.2; 303/113.2
[58] Field of Search .................. 303/113.1, 113.2, 303/116.1, 116.2

[56] References Cited

U.S. PATENT DOCUMENTS

| | | |
|---|---|---|
| 4,878,715 | 11/1989 | Toda . |
| 5,169,216 | 12/1992 | Schmidt et al. . |
| 5,271,667 | 12/1993 | Takata et al. . |
| 5,368,374 | 11/1994 | Fujimoto ................... 303/116.2 |
| 5,374,112 | 12/1994 | Takata et al. . |
| 5,405,191 | 4/1995 | Nishiyama et al. . |

FOREIGN PATENT DOCUMENTS

| | | |
|---|---|---|
| 2-018150 | 1/1990 | Japan . |
| 5-193473 | 8/1993 | Japan . |
| 6-080071 | 3/1994 | Japan . |
| 6-191388 | 7/1994 | Japan . |
| WO 91/18776 | 12/1991 | WIPO . |
| WO 93/21047 | 10/1993 | WIPO . |

*Primary Examiner*—Matthew C. Graham
*Attorney, Agent, or Firm*—Cushman, Darby & Cushman; IP Group of Pillsbury; Madison & Sutro LLP

[57] ABSTRACT

This invention has its purpose in providing a brake fluid pressure control device which is simply structured but still satisfies a driver's braking feeling and which controls wheel cylinder pressure without using master cylinder pressure. The brake fluid pressure control device of this invention is comprised of a master cylinder, a pump, a pipe which connects the suction side of the pump to the pipe of the master cylinder, a closed storage chamber with a fixed capacity which is provided in the pipe and filled with brake fluid, a check valve which is installed closer to the master cylinder than the storage chamber and which allows bidirectional flow of brake fluid from the master cylinder to the suction side of the pump, a control valve used to open and close the passage between the storage chamber and the suction side of the pump, a prohibition means which prohibits flow of brake fluid between the master cylinder and wheel cylinder when brake fluid is drawn from the storage chamber and discharged, a pressure rise/drop control means which controls rise and drop of brake pressure exerted on the wheel cylinder, and a reservoir.

7 Claims, 14 Drawing Sheets

BRAKE FLUID PRESSURE CONTROL DEVICE WITH SEALED FLUID STORAGE CHAMBER

CROSS-REFERENCE TO RELATED APPLICATIONS

This application is related to and claims priority from Japanese Patent Application Nos. 6-327616 and 7-265686, incorporated herein by reference.

BACKGROUND OF THE INVENTION

1. Field of the Invention

This invention relates to a brake fluid pressure control device which can carry out traction control to maintain an optimum slippage condition of wheels, and a brake fluid pressure control device which can control movement and speed of a vehicle by controlling brake fluid pressure of each wheel, not by using master cylinder pressure.

2. Description of the Related Art

Conventionally, a brake fluid pressure device which maintains an optimum slippage condition of wheels to generate a braking force or driving force during braking or driving of a vehicle has been known. In other words, this type of brake fluid pressure control device can carry out anti-skid control during braking and traction control (hereunder called TRC control) during driving. This type includes, for instance, the wheel braking control device which was described in Japanese Patent Publication Laid-Open No. Hei. 5-193473.

A brief description of this conventional device is given below using FIG. 14. The brake system which generates a braking force to each wheel is composed of master cylinder 2, used as a hydraulic power source to generate master cylinder pressure when brake pedal 1 is depressed, and first wheel cylinder 111 and second wheel cylinder 112, which are connected to each other through the master cylinder 2 and brake pipe 120. With this type of brake system, at least master pressure cut-off valve 103, which is used to shut off master cylinder 2 and each wheel cylinder 111 and 112 during the brake fluid pressure control by TRC control, and pump 108, which is operated while brake fluid pressure is controlled or while brake fluid stored inside the reservoir 109 is returned to master cylinder 2, are provided. Furthermore, first pressure rise control valve 104, which controls increase of the wheel cylinder pressure by allowing or prohibiting a flow of brake fluid discharged from pump 108 to second wheel cylinder 111, and second pressure rise control valve 106, which controls increase of the wheel cylinder pressure by allowing or prohibiting a flow of brake fluid discharged from pump 108 to second wheel cylinder 112, are connected to brake pipe 120. Furthermore, return pipe 121 is provided to connect wheel cylinders 111 and 112 and reservoir 109. In this return pipe 121, pressure drop control valves 105 and 107 are provided for wheel cylinders 111 and 112 respectively, to control pressure drop of each wheel cylinder by opening and closing the path between wheel cylinders 111, 112 and reservoir 109. This structure enables execution of anti-skid control.

Conventionally, adopting the following constitution in the above hydraulic circuit has achieved the brake system which enables TRC control. In other words, pipeline 101 is provided to connect master cylinder 2 side to the suction side of pump 108, and control valve 100 is also installed to open and close the path of pipeline 101.

With this type of brake system, the needle of each valve is positioned as shown in FIG. 14 when the brake is activated. During antiskid control, master pressure cut-off valve 103 and control valve 100 are closed to separate master cylinder 2 from wheel cylinders 111 and 112. Controlling pressure rise control valves 104, 106 and pressure drop control valves 105, 107 individually enables pump 108 to suck brake fluid from reservoir 109 and discharge it, thus controlling increase/decrease of the wheel cylinder pressure. The reason that control valve 100 is closed during antiskid control is, for instance, to avoid the situation in which, when brake fluid flows from master cylinder 2 through pipeline 101 to reservoir 109 and fills reservoir 109, brake fluid added to the wheel cylinders during decrease of wheel cylinder pressure has nowhere to go, thus disabling pressure decrease.

Furthermore, during TRC control, master pressure cut-off valve 103 is closed and control valve 100 is opened. Since only a little amount of brake fluid exists in reservoir 109 during TRC control, pump 108 sucks brake fluid through control valve 100 from reservoir 2a, which is provided in master cylinder 2, thus increasing the wheel cylinder pressure. The reason why master pressure cut-off valve 103 is closed during TRC control is given below. During TRC control, the brake pedal is not depressed; thus pressure inside the master cylinder 2 does not increase. Thus, by closing master pressure cut-off valve 103, flow of brake fluid discharged from pump 108 to the master cylinder is avoided, thereby enabling increase of the wheel cylinder pressure.

As explained above, with the conventional brake system, during TRC control, brake fluid is drawn from reservoir 2a of master cylinder 2 and discharged from the pump 108 to each wheel cylinder to generate the wheel cylinder pressure. However, with this brake system, the demand that a depression of brake pedal 1 made by the driver when he notices slip of wheels during TRC control be reflected on the brake fluid pressure exists. Thus, to cause flow of brake fluid as a result of a depression of brake pedal 1 made by the driver during TRC control, the TRC control is terminated and normal brake control mode is restored. At this time, master pressure cut-off valve 103 is opened to allow brake fluid in master cylinder 2 to flow to the wheel cylinders, while control valve 100 is closed. However, this method of initiating braking as a result of a depression of the brake causes a delay in open/close control of each valve. During this delay, master pressure cut-off valve 103 is closed but control valve 100 is open, thereby allowing brake fluid to flow from master cylinder 2 through control valve 100; thus, no feeling of pedal pressure exists during the initial depression of the brake pedal. Therefore, a request for improvement in the driver's pedal sensation is satisfied to some extent even in the initial stage of a depression of brake pedal by the driver during TRC control, since it is still made possible for the brake fluid to flow from the master cylinder 2, thus allowing brake pedal 1 to be depressed for a certain extent of the stroke.

However, since brake fluid which is discharged from the master cylinder and has passed through control valve 100 flows towards the wheel cylinders as a result of a depression of the brake pedal 1, both brake fluid which is drawn from the master cylinder by pump 108 during TRC and brake fluid which flows in as result of a depression of brake pedal 1 exist in, for instance, reservoir 109 of the wheel cylinder (i.e., outside master cylinder 2) at the end of the delay. At the end of TRC control, this brake fluid is returned at once to reservoir 2a through master cylinder 2 by pump 108, thus exerting excessive load on master cylinder 2.

SUMMARY OF THE INVENTION

In view of the above problems of the prior art, an object of this invention is to provide a brake fluid pressure control device which enables increase and decrease of the wheel cylinder pressure during TRC control, irrespective of whether or not the brake pedal is depressed; which improves the driver's braking sensation by allowing initial depression of the brake when the driver realizes slip of the vehicle; and which reduces load exerted on the hydraulic pressure source when brake fluid is returned to the hydraulic pressure source at the end of TRC control.

To achieve the above objects, a first aspect of the present invention provides a brake fluid pressure control device described which has a storage chamber in the second brake pipe to generate a vacuum, and prohibits a flow of brake fluid between the hydraulic power source and wheel cylinder during brake fluid pressure control. The second brake pipe connects the hydraulic power source to the suction side of the pump. However, introduction of the brake fluid storage-supply control in the second brake pipe as described above stops brake fluid from flowing out of the master cylinder by pump suction when no brake fluid pressure is produced in the hydraulic power source.

It is possible that a vacuum is generated when brake fluid is sucked by the pump; thus, the capacity of the storage chamber can be fixed. In this case, a vacuum can be generated with a simple structure. Further, it is also possible to constitute the brake fluid supply means by simply using a check valve, thus making the structure simple.

Additionally, it is also possible to use a structure in which the brake fluid is enclosed inside the storage chamber to help generation of vacuum. This generates vacuum in the storage chamber easily when the gas or liquid is drawn by the pump from the storage chamber to the wheel cylinder. In other words, the brake fluid is normally non-compressive; thus, a vacuum is generated in proportion to expansion of the gas present in the brake fluid when the brake fluid is drawn from the storage chamber by the pump. However, the quantity of gas dissolved in the brake fluid is small and only a small quantity of the above-mentioned content is separated; thus, the quantity of the brake fluid which is to flow is accordingly considered to be small. Therefore, if compressive gas or liquid is enclosed in the storage chamber, a vacuum will be generated when the gas or liquid expands.

If a reservoir is installed, the brake fluid added to the wheel cylinder during control of wheel cylinder pressure drop performed by the pressure control method can be stored in the reservoir. Moreover, it is also possible to introduce a third brake pipe and return control valve. In this case, high-pressure load exerted on each pipe can be reduced during maintenance control of the wheel cylinder pressure carried out by the pressure control means.

Still further, it is also possible to introduce a pipe having valve needles and elastic elements in the tank. In this case, if the elasticity of the elastic elements is higher than the vacuum generated in the tank or pipe by suction of the pump, flow of brake fluid between the hydraulic power source and tank will be eliminated when the brake fluid inside the tank is sucked by the pump while the brake pedal is not depressed.

Moreover, if two valve needles and two valve seats are installed in the above-mentioned pipe, it will be possible to allow and prohibit flow of brake fluid from the hydraulic power source into the tank according to the quantity of brake fluid in the tank when brake fluid pressure is generated in the hydraulic power source. In other words, when the tank is sufficiently filled with brake fluid, the valve needles will seat on the valve seats to prohibit flow of brake fluid into the tank, thus protecting the tank and hydraulic circuit elements.

Since the first and second valve needles can be interlocked because they are connected by elastic elements and the position of the second valve needle can be changed as the valve seat interlocking with the piston pushes the second valve needle, it is possible to allow and prohibit flow of brake fluid from the hydraulic power source into the tank according to the quantity of brake fluid in the tank.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Embodiments of a brake fluid pressure control device of this invention are explained below using the appended figures. The brake fluid pressure control device of this embodiment applies to driving wheels and non-driving wheels, and is suitable for FF, FR and 4WD cars. Normally, a brake system of a vehicle consists of two brake systems: a T—T pipe system for right front/left front wheel and right rear/left rear wheel systems, and an X pipe system for right front/left rear and left front/right rear wheel systems. In the first embodiment, a description of brake piping used for the right front/left front wheel brake system adopting a T—T pipe in a 4WD car is given below.

Figure 1:
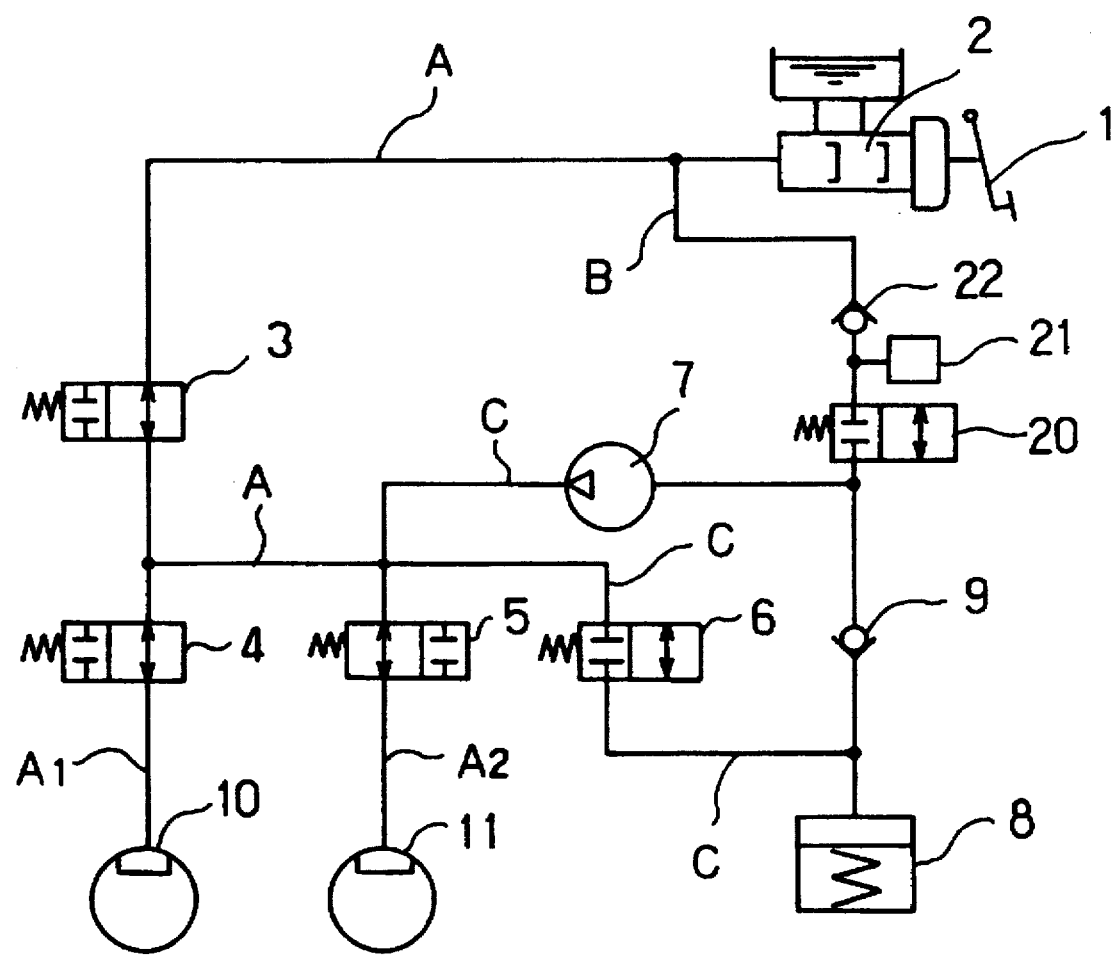
FIG. 1 shows a hydraulic circuit according to a first preferred embodiment of the present invention.

In FIG. 1, brake pedal 1 is connected to master cylinder 2, which is used as a hydraulic power source having its own reservoir. Brake fluid pressure generated in master cylinder 2 due to a depression of the brake pedal 1 by the driver is conveyed through the first brake pipe A to first wheel cylinder 10 and second wheel cylinder 11. First brake pipe A is branched and has first branch pipe A1 and second branch pipe A2. Wheel cylinders 10 and 11 are connected to the end of first branch pipe A1 and second branch pipe A2 respectively. In this way, first brake pipe A is used to connect master cylinder 2 to wheel cylinders 10 and 11, to perform normal braking by means of conveyance of the master cylinder pressure. First wheel cylinder 10 is used for the left front wheel, and second wheel cylinder 11 for the right front wheel.

Master pressure cut-off valve 3 which is connected to the first brake pipe A extending from the exit of master cylinder 2 connects or disconnects master cylinder 2 to or from wheel cylinders 10 and 11. This master pressure cut-off valve 3 is provided on the first brake pipe A at a point between master cylinder 2 and the junction of branch pipes A1 and A2. A pipe extending from the discharge port of pump 7 used to draw brake fluid from reservoir 8 is connected to the first brake pipe A at a point between master pressure cut-off valve 3 and wheel cylinders 10 and 11.

A first pressure rise control valve 4 is installed in the first branch pipe A1. This first pressure rise control valve 4 controls flow of brake fluid discharged from pump 7 to the first wheel cylinder 10. In addition, a second pressure rise control valve 5 is installed in the branch pipe A2. This second pressure rise control valve 5 controls flow of brake fluid discharged from pump 7 to the second wheel cylinder 11.

A return control valve 6 is installed in parallel with pump 7. Third brake pipe C is formed by the pipe in which the above return control valve 6 is installed and the pipe to which the above mentioned pump 7 is connected. The third brake pipe C forms a return passage for brake fluid discharged from the pump 7 to flow back through return control valve 6 and reservoir 8. Check valve 9 is installed at the suction side of pump 7 and allows brake fluid to flow in one direction only—from reservoir 8 to the suction side of pump 7.

A second brake pipe B is provided. One of its ends is connected between master cylinder 2 and master pressure cut-off valve 3 in the first brake pipe A, and the other end is connected between check valve 9 of third brake pipe C and pump 7. In this second brake pipe B, control valve 20 which opens and closes the passage of brake pipe B is installed. Check valve 22 is connected between control valve 20 and the first brake pipe A to allow flow of brake fluid in one direction only—from master cylinder 2 to the third brake pipe C side. A fluid storage chamber 21 having a sealed structure with a fixed capacity is connected between control valve 20 and check valve 22.

Master pressure cut-off valve 3, first and second pressure rise control valves 4 and 5, return control valve 6 and control valve 20 are two-way types, and their valve needles change their positions to switch the port position when the solenoid is excited as power is supplied from the control section (not shown in FIG. 1). When the valves are not in operation, the port is positioned as shown in the Figure. For valves 3, 4, 5, 6 and 20, which are solenoid-type valves, mechanical-type valves can be used instead.

Operation of the brake fluid pressure control device of the first embodiment is described below.

During normal braking operation, each valve is positioned as shown in Mode A in TABLE I below, where master pressure cut-off valve 3 and first and second pressure rise control valves 4 and 5 are opened, while return control valve 6 and control valve 20 are closed. Thus, brake fluid pressure generated in master cylinder 2 due to a force exerted on brake pedal 1 is conveyed through the first brake pipe A to the first and second wheel cylinders 10 and 11.

If a sensor (not shown in the figure) detects, using a relationship between the wheel speed and vehicle speed, that the wheels are going to be locked during braking, antiskid control will be performed to avoid locking of the wheels and to put the wheels under the most suitable slip condition. A description of

TABLE I

| Anti-Skid Braking, TRC Modes | | 1st | 2nd | Rtn. | Anti | |
|---|---|---|---|---|---|---|
| Cyl. 10 Mode | Cyl. 11 Mode | Cut-Off 3 | Ctrl. 4 | Ctrl. 5 | Ctrl. 6 | Skid Ctrl. | TRC 20 |
| A Normal Braking | | O | O | O | X | X | X |
| B Maintain | Maintain | X | X | X | O | X | O |
| C Maintain | Decrease | X | X | O | O | X | O |
| D Decrease | Decrease | X | O | O | O | X | O |
| E Decrease | Maintain | X | O | X | O | X | O |
| F Increase | Maintain | X | O | X | X | X | O |
| G Maintain | Increase | X | X | O | X | X | O |
| H Increase | Increase | X | O | O | X | X | O |
| I Reservoir 8 Full | | X/O | X | X | X | O | O |

O = Open
X = Closed operation of the brake fluid pressure control device during antiskid control is given below.

As shown in Modes B to H of TABLE I, the brake fluid pressure exerted on the first and second wheel cylinders 10 and 11 is controlled by each wheel cylinder in maintenance, pressure rise, drop or their combined mode. Pump 7 begins to operate at the same time as the antiskid control starts, and draws brake fluid from reservoir 8 and discharges it to wheel cylinders 10 and 11.

As shown in Mode B in TABLE I, during antiskid control mode, in which brake fluid pressure exerted on the first and second wheel cylinders 10 and 11 is maintained, master pressure cut-off valve 3 and first and second pressure rise control valves 4 and 5 are closed, while return control valve 6 is opened. Control valve 20 is kept closed during antiskid control. Furthermore, master pressure cut-off valve 3 is closed to shut off high master cylinder pressure generated by master cylinder 2 during antiskid control. Return control valve 6 is kept opened; thus, brake fluid discharged from pump 7 can flow back to reservoir 8 using the third brake pipe C.

In other words, connecting pump 7 and return control valve 6 in parallel and connecting them to reservoir 8 forms a return passage for the brake fluid discharged from pump 7, eliminating the possibility that brake fluid discharged from pump 7 is stored under high pressure. Thus, safety of the brake fluid pressure control device can be improved.

Next, operation of each valve in antiskid control mode in which the pressure of both first and second wheel cylinders 10 and 11 is reduced as shown in Mode D of TABLE I is described below. As understood therefrom, the first and second pressure rise control valves 4 and 5 and return control valve 6 are open; thus, the brake fluid added to wheel cylinders 10 and 11 flows into reservoir 8. Although pump 7 continues to operate, brake fluid is released from the wheel cylinders 10 and 11 at a higher speed, thus reducing the pressure of each wheel cylinder. This reduction of wheel cylinder pressure is performed when a slip ratio of the wheels increases; for instance, when the wheels are locked, so that the wheel speed is restored.

Next, operation of each valve in the mode in which the pressure of either the first or second wheel cylinder is maintained while the pressure of the other wheel cylinder is reduced as shown in Modes C and E of TABLE I is described. As understood from the figures, in either case, return control valve 6 is open. The pressure rise control valve for the wheel cylinder which uses one of first and second pressure rise control valves 4 and 5 in maintenance mode is closed, while the pressure rise control valve for the wheel cylinder which uses one of first and second pressure rise control valves 4 and 5 in reduction mode is opened. For instance, during the mode in which the pressure of the first wheel cylinder 10 is put under maintenance mode while the pressure of the second wheel cylinder 11 is put under reduction mode, the first pressure rise control valve 4 is closed and the second pressure rise control valve 5 is opened. The case in which the system is controlled so that the control mode of wheel cylinder 10 differs from that of wheel cylinder 11 is the case in which the slip ratio of the right wheel and that of the left wheel that is, braking conditions for the right wheel and for the left wheels differ from each other due to differences in the road condition between the right and left wheels. In this case, the system is controlled so that the control mode of wheel cylinder 10 differs from that of wheel cylinder 11 to optimize the braking condition for both right and left wheels.

Furthermore, as shown in Modes F and G of TABLE I, the optimum braking condition for wheels is achieved by maintaining the pressure of either first wheel cylinder 10 or second wheel cylinder 11 and using the mode which increases the pressure of the other cylinder.

In this case, return control valve 6 is closed, and the pressure rise control valve for the wheel cylinder which uses one of the first and second pressure rise control valves 4 and 5 in maintenance mode is closed while the pressure rise control valve for the wheel cylinder which uses one of valves 4 and 5 in increase mode is opened. In other words, if the pressure of the first wheel cylinder 10 is put in increase mode and the pressure of the second wheel cylinder is put in maintenance mode, the first pressure rise control valve 4 will be open and the second pressure rise control valve 5 will be closed.

In this way, the pressure control mode for first wheel cylinder 10 can be different from that of the second wheel cylinder 11. This is possible because both wheel cylinders 10 and 11 have their own pressure rise control valve 4 and 5, respectively, and these pressure rise control valves can be controlled individually.

Moreover, as shown in Mode H of TABLE I, pressure of both first and second wheel cylinders 10 and 11 can be increased by the brake fluid pressure discharged from pump 7. In this case, as can be understood from the Table, return control valve 6 is closed and both first and second pressure rise control valves 4 and 5 are opened to allow the brake fluid from pump 7 to be discharged to wheel cylinders 10 and 11.

If the quantity of brake fluid returned to reservoir 8 from wheel cylinders 10 and 11 increases when the pressure of both wheel cylinders 10 and 11 is decreasing during antiskid control and therefore reservoir 8 is filled, control of each valve as shown in Mode I of TABLE I is allowed. In other words, the first and second pressure rise control valves 4 and 5 and return control valve 6 are closed, while master pressure cut-off valve 3 is repeatedly opened and closed at certain intervals. In this way, when the brake fluid pressure in the pipe exceeds the master cylinder pressure as it is discharged from the pump, the brake fluid in the brake pipe can be returned to master cylinder 2 or its reservoir, thus reducing the quantity of brake fluid in reservoir 8. This enables precise control of decrease in the wheel cylinder pressure during antiskid control.

As described above, control valve 20 is closed during antiskid control. This is because if control valve 20 is not closed, high-pressure brake fluid from master cylinder 2 flows into the suction side of pump 7 and check valve 9; thus, pump 7 does not suck brake fluid from reservoir 8 but from master cylinder 2. In other words, closing control valve 20 can prevent reservoir 8 from becoming full.

Moreover, the system can be constructed so that if the driver relaxes the force applied to brake pedal 1, this action is detected by the control section (not shown in FIG. 1) to open master pressure cut-off valve 3 and first and second pressure rise control valves 4 and 5. This causes the brake fluid which is exerting wheel cylinder pressure to flow towards master cylinder 2, thus decreasing the wheel cylinder pressure and restoring the wheel speed. As a result, antiskid control comes to an end. This enables brake fluid pressure control to reflect the driver's intention for relaxing brake pedal 1.

If a sensor (not shown in FIG. 1) detects, using a relationship between the wheel speed and vehicle speed, that the wheels are going to be slipping, TRC control, which avoids slippage of wheels and puts the wheels under optimum slippage condition, begins. Description of operation of the brake fluid pressure control device during TRC control is given below.

During TRC control, brake fluid is not usually supplied from master cylinder 2. Thus, almost no brake fluid exists in reservoir 8 and pressure increase control of the wheel cylinder pressure is controlled by the brake fluid stored in storage chamber 21 during TRC control. Unlike antiskid control, control valve 20 is opened during TRC control.

If the wheels slip more than a specified level of slip when they are rotating, pump 7 begins to operate. Operation of pump 7 applies a negative pressure to storage chamber 21. As a result, a flow occurs towards pump 7, while storage chamber 21 is kept in a vacuum state. TRC control mode for each wheel cylinder pressure to be carried out by discharge of pump 7, that is, pressure increase and decrease control, is carried out by each valve in the same way as the valves are operated during antiskid control. In other words, if each valve is operated as shown in Modes B to H of TABLE I, pressure increase/decrease and maintenance control of wheel cylinders 10 and 11 can be carried out independently. In general, check valve 22 does not open its pipe passage unless brake fluid with pressure of more than one atmosphere is applied. Thus, brake fluid is not drawn from master cylinder 2 due to vacuum created by suction of pump 7, but it is drawn from storage chamber 21. Check valve 22 is used for storage/supply of brake fluid. Although brake fluid is non-compressible, gas mixed in the brake fluid is separated due to vacuum and stored. As this gas expands, brake fluid of the same quantity as the volume of the gas flows out from storage chamber 21 into the pipe.

At the end of TRC control, the same quantity of brake fluid as that of the fluid which flowed from storage chamber 21 is drawn and stored in storage chamber 21 due to a vacuum generated in storage chamber 21. If the brake pedal is depressed or accelerating slippage is eliminated, TRC control comes to an end. As a result, each valve state returns to the normal brake state, for example, control valve 20 is closed.

A brake fluid pressure control device constituted as above is described below.

In the above embodiment, second brake pipe B is provided to connect master cylinder 2 and the suction side of pump 7. Installing control valve 20, fluid storage chamber 21 and check valve 22 in this second brake pipe B enables execution of TRC control in addition to antiskid control. During TRC control, brake fluid drawn from storage chamber 21 is used instead of brake fluid drawn from the master cylinder 2, to increase the pressure of each wheel cylinder. Moreover, at the end of TRC control, brake fluid which has been generating wheel cylinder pressure during TRC control is stored in storage chamber 21, for instance, during the delay time between when the end of TRC control is judged and when control valve 20 is closed. In the case where storage chamber 21 does not become full within the above delay time, brake fluid will be supplied from the master cylinder 2 when the brake pedal 1 is depressed next time. However, storage chamber 21 having a capacity as small as a few cubic centimeters is sufficient; thus, storage chamber 21 will be filled in the earliest stage of depression of the brake pedal, since no influence will be made on the braking delay when the brake pedal is depressed and brake fluid is stored in the storage chamber due to vacuum.

If the driver depresses brake pedal 1 because he notices that the wheels have slipped during TRC control mode, brake fluid begins to flow from master cylinder 2 through check valve 22 of second brake pipe B into storage chamber 21 where a vacuum is present. In other words, during the control delay from when the end of TRC control is judged due to depression of brake pedal 1 until control valve 20 is closed and master pressure cut-off valve 3 is opened, the specified quantity of brake fluid is supplied from master cylinder 2 into storage chamber 21. This enables initial depression of brake pedal 1. Moreover, since brake fluid from master cylinder 2 passes through check valve 22, resistance can occur during depression of brake pedal 1, thus further reducing the feeling of pedal pressure. During the control delay, the brake fluid which flows from master cylinder 2 to the suction side of the pump 7 due to depression of the brake pedal 1 is merely drawn by the pump 7 since it enters the storage chamber 21 where a vacuum is present. Thus, to increase the wheel cylinder pressure during TRC control, the same quantity of brake fluid as that drawn from the storage chamber 21 by the pump 7 flows into storage chamber 21 from master cylinder 2. In other words, since the quantity of brake fluid returned by the pump 7 from the wheel cylinder to master cylinder 2 at the end of TRC control matches that of the brake fluid which flows from master cylinder 2 to the wheel cylinder (inside storage chamber 21), it is possible to reduce the load which is exerted on the master cylinder 2 during return of the brake fluid.

Figure 2:
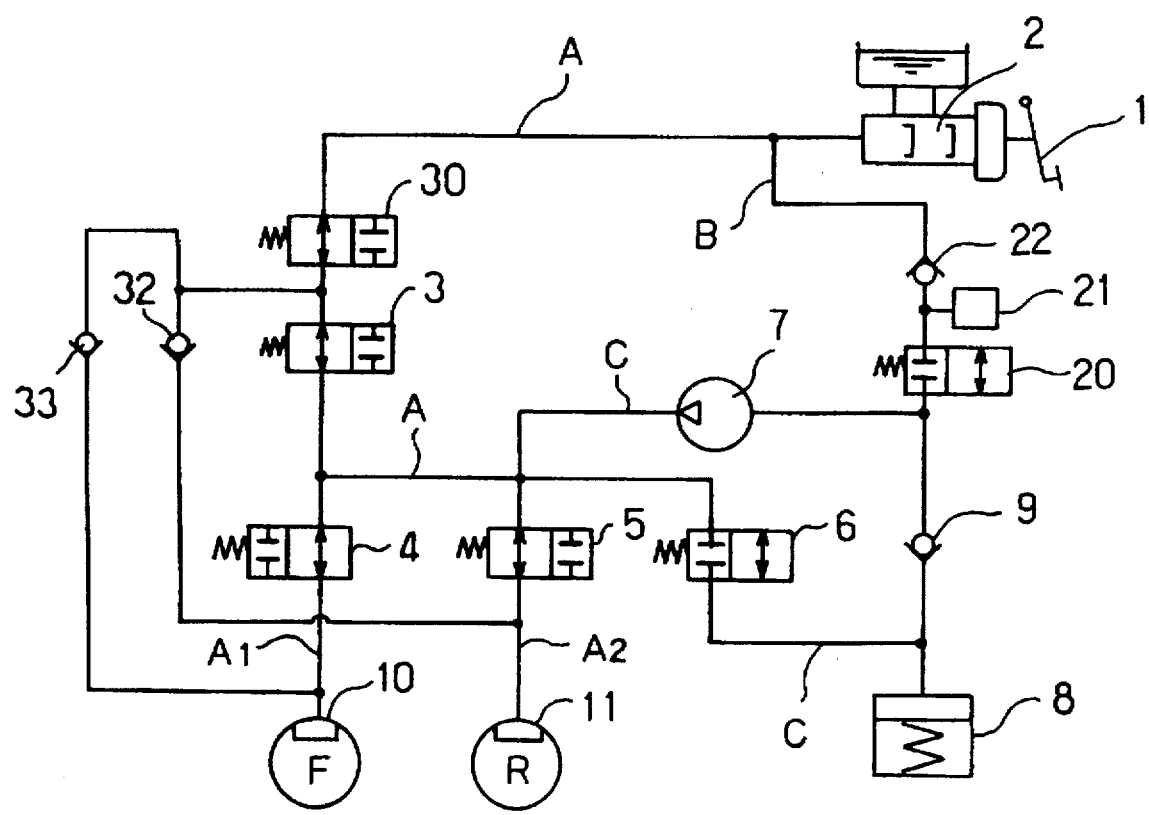
FIG. 2 shows a modification of the first embodiment.

Next, a modification of the above first embodiment is described below using FIG. 2.

In this modification, selector valve 30 is installed before master pressure cut-off valve 3 in the first brake pipe A of the hydraulic circuit of the brake fluid pressure control device shown in FIG. 1. In addition, a pipe is installed with one of its ends is connected between the above selector valve 30 and master pressure cut-off valve 3, and other ends connected between first and second wheel cylinders 10 and 11 and first and second pressure rise control valves 4 and 5, respectively. Check valves 32 and 33 are installed in this pipe to allow flow of brake fluid in one direction only—from the wheel cylinders 10 and 11 to the master cylinder 2.

Results of the brake fluid pressure control device having the above structure are described below. Description for the same results as those of the first embodiment is omitted.

During normal braking, the ports of valves 30, 3–6 and 20 are positioned as shown in the figure, and master cylinder pressure is conveyed through the first brake pipe A to the first and second wheel cylinders 10 and 11.

During antiskid control, selector valve 30 is opened and master pressure cut-off valve 3 is closed. By this master pressure cut-off valve 3, master cylinder pressure is shut off. Control valve 20 is also closed. During antiskid control, the first and second pressure rise control valves 4 and 5 and return control valve 6 are controlled as shown in TABLE I for pressure increase/decrease control of each wheel cylinder.

During TRC control, selector valve 30 is closed and master pressure cut-off valve 3 is opened. Control valve 20 is also opened. During TRC control, the first and second pressure rise control valves 4 and 5 and return control valve 6 are controlled as shown in TABLE I for pressure increase/decrease control of each wheel cylinder. It does not matter whether master pressure cut-off valve 3 is closed or opened as long as selector valve 30 is closed.

Results of the modified embodiment having the above structure are described below.

During antiskid control, selector valve 30 is opened, and the following results can be obtained by installing check valves 32 and 33. In other words, when the driver relaxes the force applied to brake pedal 1 because he notices that the wheels are likely to be locked during antiskid control, the brake fluid, which has been applying wheel cylinder pressure to wheel cylinders 10 and 11, passes check valves 32 and 33 located in the pipe and flows into master cylinder 2. This enables brake fluid pressure control during antiskid control in such a way that the driver's intention is reflected together with return of brake pedal 1 when the force applied to brake pedal 1 is loosened, thereby improving braking sensation.

Furthermore, during TRC control, master cylinder 2 is separated from the wheel cylinder since selector valve 30 is closed. This causes brake fluid discharged from pump 7 to flow to the wheel cylinder, thus enabling application of wheel cylinder pressure.

Next, a second embodiment of this invention is described below using FIG. 3 and TABLE II below. The same reference numerals will be used for the structure which provides the same operation result, and the description of such structure is omitted. This embodiment describes the structure in which a brake pipe is used for the X-pipe type left front/right rear wheel braking system of an FR car. The first wheel cylinder 10 is provided for the left front wheel and the second wheel cylinder 11 is provided for the right rear wheel. The front wheels are rolling wheels to which no driving force is applied.

In this second embodiment, first pressure rise control valve 4 is removed from the first branch pipe A1 of the first brake pipe A in the hydraulic circuit of the brake fluid pressure control device shown in FIG. 1, and pressure control valve 31 is installed at the position shown in the Figure instead of the first pressure rise control valve 4. In other words, the first wheel cylinder 10 from master cylinder 2 is directly open through master pressure cut-off valve 3.

Operation of the brake fluid pressure control device constituted as described above is described below using TABLE II. In normal braking operation, master pressure cut-off valve 3,

TABLE II

| Anti-Skid Braking, TRC Modes | | | 1st | 2nd | Rtn. | Anti | |
|---|---|---|---|---|---|---|---|
| Cyl. 10 Mode | Cyl. 11 Mode | Cut-Off 3 | Ctrl. 31 | Ctrl. 5 | Ctrl. 6 | Skid Ctrl. | TRC 20 |
| A | Normal Braking | | O | O | O | X | X | X |
| B | Maintain | Maintain | X | X | X | O | X | O |
| C | Maintain | Decrease | X | X | O | O | X | O |
| D | Decrease | Decrease | X | O | O | O | X | O |
| E | Decrease | Maintain | X | O | X | O | X | O |
| F | Increase | Maintain | X | O | X | X | X | O |
| G | Maintain | Increase | X | X | O | X | X | O |
| H1 | Increase | Decrease | O | X | O | O | X | O |
| H2 | Decrease | Increase | O | X | O | X | X | O |
| I | Increase | Increase | X | O | O | X | X | O |
| J | Reservoir 8 Full | | X/O | X | X | X | O | O |

Figure 3:
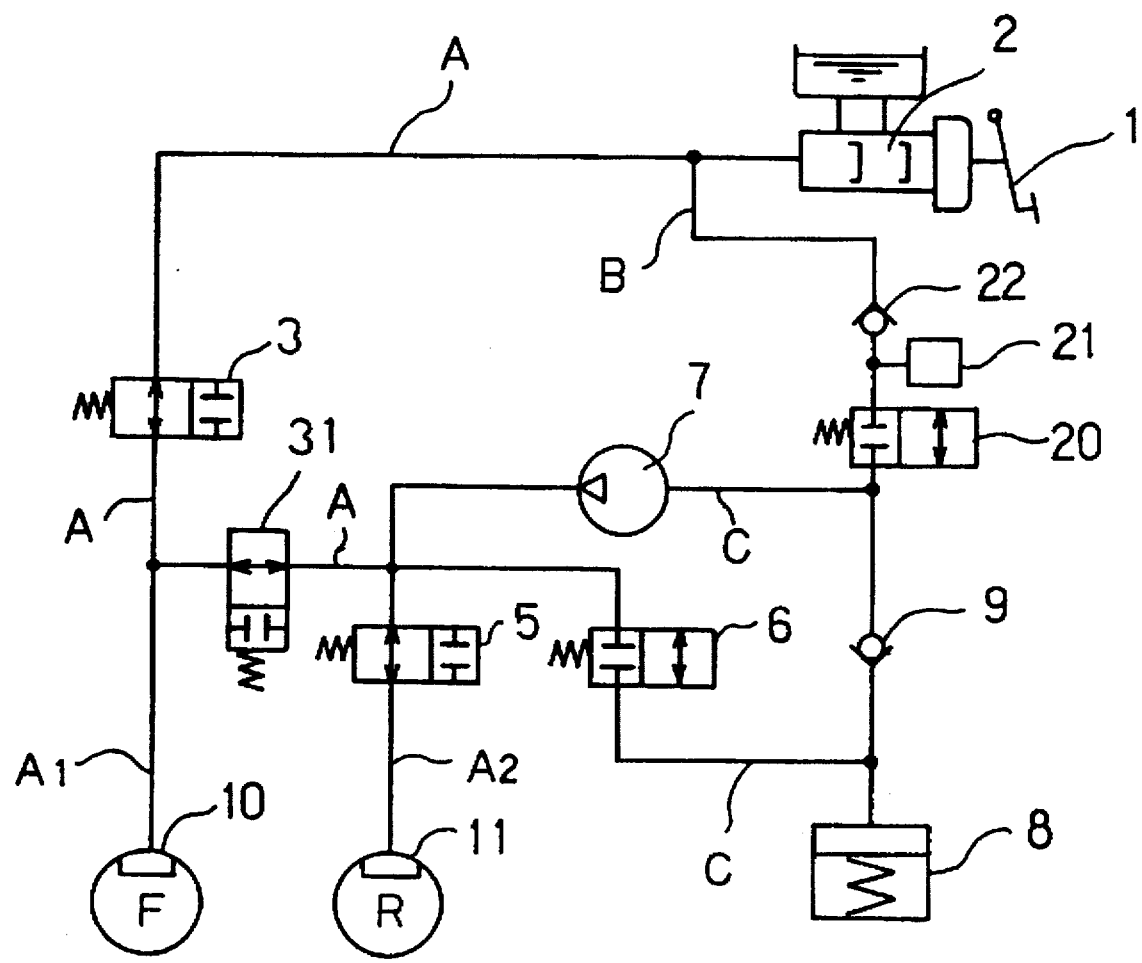
FIG. 3 shows a second preferred embodiment of the present invention.

O = Open
X = Closed pressure control valve 31, second pressure rise control valve 5, return control valve 6 and control valve 20 are positioned as shown in FIG. 3, and this operation corresponds to Mode A of TABLE II. During antiskid control and TRC control, operation of each valve in various modes shown in Modes B–G, I and J of TABLE II is illustrated in the figures. Exactly the same result as the first embodiment can be achieved. Thus, the control mode specific to the second embodiment, that is, the control mode shown in Mode H of TABLE II, is explained below.

The following is a description of operation of each valve during the mode shown in Mode H(1) of antiskid control mode, in which wheel cylinder 10 for the right front wheel is put in pressure rise mode and wheel cylinder 11 for the left rear wheel is put in pressure drop mode. If the road conditions for the right-side wheels of a vehicle differ from that for the left-side wheels as described above, antiskid control mode for wheel cylinder 10 may differ from that for wheel cylinder 11. For instance, if the road surface for the right-side wheels is a high-μ surface and that for left-side wheels is a low-μ surface, it is preferable in some cases for high brake pressure to be applied to the first wheel cylinder 10 to generate a large braking force and the pressure to the second wheel cylinder 11 to be reduced to restore the vehicle speed to maintain an optimum slippage condition. During control of a normal vehicle, front wheels can generate a larger braking force than rear wheels due to transfer of the vehicle weight; thus, it is preferable for the highest possible pressure to be applied to the wheel cylinder of the front wheels to generate a high braking force. Antiskid control mode shown in TABLE II is made available with the above point taken into consideration. In this mode, master pressure cut-off valve 3 is opened even if antiskid control is in operation, thus applying master cylinder pressure to the first wheel cylinder 10. This causes the pressure to the first wheel cylinder 10 to increase and produce a large braking force suitable for the road condition under the wheels. The first pressure control valve 31 is closed in this mode. This prohibits the master cylinder pressure from being conveyed to the second wheel cylinder 11. The second pressure rise control valve 5 and return control valve 6 are open in this mode. This causes the brake fluid applied to the second wheel cylinder 11 to be returned to reservoir 8. The brake fluid from pump 7 also returns through the third brake pipe C into reservoir 8. As a result, the pressure to the second wheel cylinder 11 is decreased.

The following is a description of the operation of each valve during TRC control mode shown in Mode H(2), in which wheel cylinder 10 for the right front wheel is put in pressure rise mode and wheel cylinder 11 for the left rear wheel is put in pressure drop mode.

In this TRC control, only the driving wheels are brought under abnormal slippage condition; thus, it is not normally necessary to apply brake fluid pressure to the rolling wheels. Thus, during a certain period after the start of control, brake fluid pressure can be applied from pump 7 to the second wheel cylinder 11 only which corresponds to the rear wheels in the case of an FR car. In this case, the first wheel cylinder 10 and master cylinder 2 can be separated from the second wheel cylinder 11 and the discharge side of pump 7 by closing pressure control valve 31 as shown in TABLE II. This causes the brake fluid discharged from pump 7 to flow towards the second wheel cylinder 11, thus increasing the pressure of the second wheel cylinder 11. Like the previous embodiment, the pressure of the second wheel cylinder 11 is increased by brake fluid supplied from storage chamber 21.

Moreover, opening master pressure cut-off valve 3 causes master cylinder 2 to be connected to the first wheel cylinder 10. In other words, when the driver depresses brake pedal 1 during TRC control, brake fluid flows from master cylinder 2 through the second brake pipe B into storage chamber 21 and the first wheel cylinder 10. As a result, a braking force is applied to the right front wheels when brake pedal 1 is depressed, thus improving braking. Furthermore, this enables a brake fluid pressure control which reflects the driver's intention.

Even in cases where the brake fluid is supplied from master cylinder 2 to the wheel cylinder during TRC control, the same quantity of brake fluid as that which flowed from master cylinder 2 will be stored in storage chamber 21 at the end of TRC control due to a vacuum present in the chamber; thus, the quantity of brake fluid returned from the wheel cylinder to master cylinder 2 is compensated. Therefore, this embodiment also provides a good braking sensation.

In the above embodiments, once brake pressure control starts, pump 7 also starts to operate. However, the device can operate as follows irrespective of whether or not pump 7 also starts to operate when brake pressure control starts. Assume that a braking force is applied to each wheel and antiskid control starts while the vehicle is either running on a ditched road under different road conditions or is turning around. Operation of each valve and pump 7 under the above condition which differs from TABLE I is described. For instance, if a braking force is applied when the road surface for the right-side wheels is a low-μ surface and that for left-side wheels is a high-μ surface, the right rear wheel will be subjected to a smaller braking force than the left front wheel; thus, the right rear wheel may be locked before the left front wheel. Moreover, in some cases, if a braking force is applied while the vehicle is turning counter-clockwise, the load tilts to the left side of the vehicle and the load on the right side becomes very small. In this case, the right rear wheel produces a smaller braking force than the left front wheel, and the right back wheel can provide only small braking power; thus, the right rear wheel may be locked before the left front wheel. In this case, almost no brake fluid pressure is applied to wheel cylinder 11 of the right rear wheel, and it is preferable for a large brake fluid pressure to be applied to wheel cylinder 10 of the left front wheel. In other words, it is preferable for the largest possible braking force to be produced by the left front wheel, since it is possible for the left front wheel to do so. First, pressure control valve 31 is closed when the tendency of the right rear wheel to lock becomes stronger. This means that master cylinder pressure from master cylinder 2 against wheel cylinder 11 of the right rear wheel is cut off first. Thus, the brake fluid from master cylinder 2 does not flow to wheel cylinder 11 of the right rear wheel, since application of master cylinder pressure to wheel cylinder 10 of the left front wheel is maintained. In this case, even if antiskid control for the right rear wheel starts, it is not necessary to start operation of pump 7. In other words, start of the pump 7 can be delayed, since it is not necessary for pump 7 to discharge fluid to the second wheel cylinder 11 if pressure decrease control is carried out while almost no brake fluid pressure is applied to wheel cylinder 11 of the right rear wheel. Since the master cylinder pressure which is higher than the pressure of brake fluid discharged from the pump 7 is applied to the first wheel cylinder 10, discharge of the pump 7 is also not necessary. Moreover, in some cases, antiskid control ends immediately after the vehicle stops turning. In other words, the vehicle stops turning when the wheels are locked due to transfer of the load caused by turning of the vehicle, and the wheels are no longer locked due to end of transfer of the load. In this case, the braking force of the front wheels does not operate pump 7 using master cylinder pressure, and the pressure of the second wheel cylinder 11 causes the second pressure rise control valve 5 to be connected to return control valve 6 or the second pressure rise control valve 5 to be closed and return control valve 6 to be opened. Since the quantity of brake fluid flowing to the wheel cylinder corresponding to the rear wheel is smaller than that for the front wheel even if brake fluid collected in reservoir 8 is not drawn by pump 7, the possibility of reservoir 8 filling up and disabling reduction of pressure is very low even if operation of pump 7 is delayed. Once the speed of the right rear wheel is restored sufficiently, increase of pulse pressure of the second wheel cylinder 11 is possible, if return control valve 6 is closed, the second pressure rise control valve 5 is opened and pressure control valve 31 is opened and closed repeatedly at certain intervals even if pump 7 has not started. Increasing the pressure of the second wheel cylinder 11 by starting discharge of pump 7 instead of the above pulse increase method is also allowed. In this case, pressure control valve 31 must be kept closed. By doing this, braking force for the vehicle can be gained appropriately, antiskid control is started during turning of the vehicle, and the wheel speed is restored quickly. When the wheel speed is restored, antiskid control ends immediately. This avoids frequent vibration and noise caused by the pump and also reduces power consumption.

Figure 4:
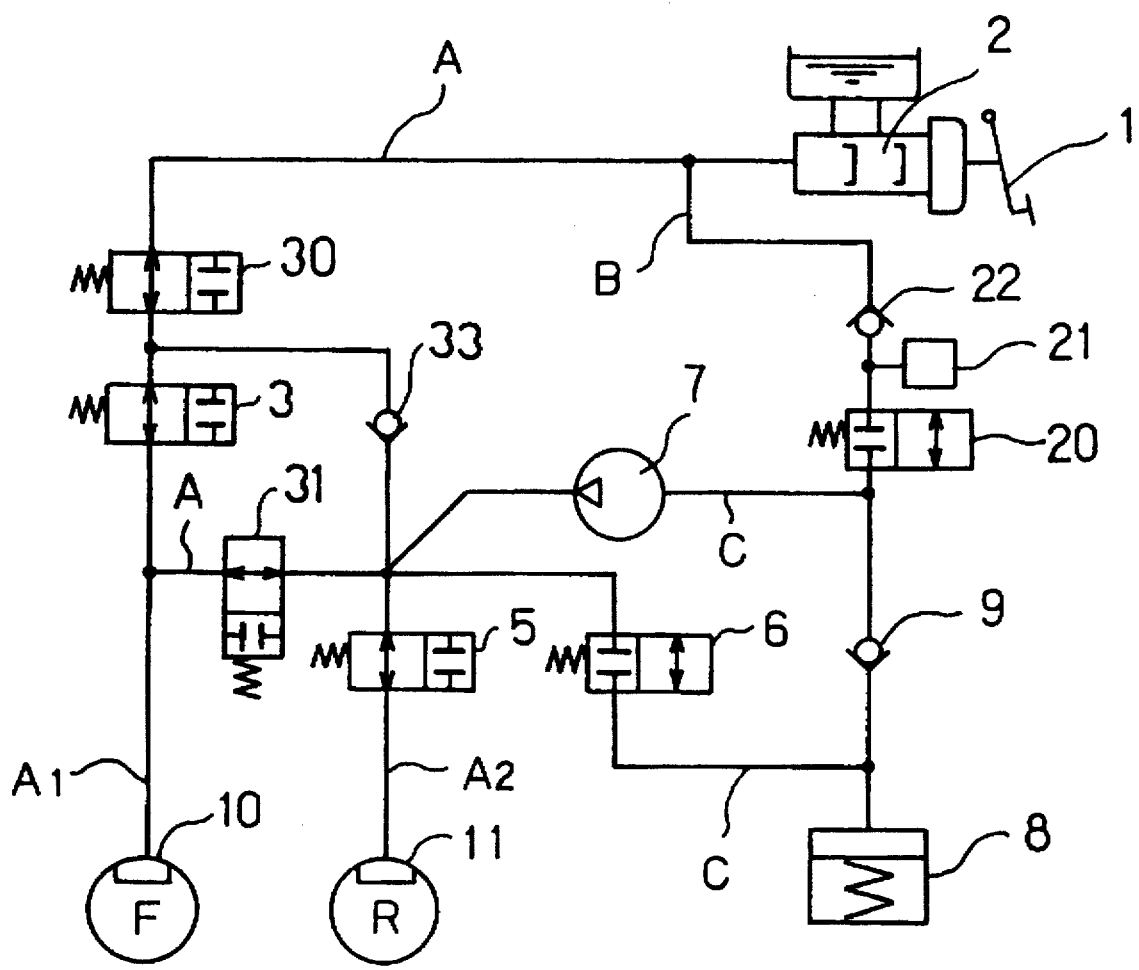
FIG. 4 shows a modification of the second embodiment.

Next, a modification of the second embodiment is described below using FIG. 4.

In this modification, selector valve 30 is installed before master pressure cut-off valve 3 in the first brake pipe A of the hydraulic circuit of the brake fluid pressure control device shown in FIG. 3. In addition, a pipe is installed, with one of its ends connected between selector valve 30 and master pressure cut-off valve 3, and the other end connected to the suction side of the pump 7 rather than pressure rise control valve 5. Check valve 33 is installed in this pipe to allow flow of brake fluid in one direction only-from wheel cylinder 11 to master cylinder 2.

Results of the brake fluid pressure control device having the above structure are described below. The ports of each valve are positioned as shown in the Figure during normal braking.

Once anti-skid control starts, selector valve 30 is opened and master pressure cut-off valve 3 is closed. When the driver relaxes the force applied to brake pedal 1 during execution of antiskid control, if this action is detected by a control section (not shown in FIG. 4) to open pressure control valve 31 and second pressure rise control valve 5, the brake fluid applied to each wheel cylinder flows through check valve 33 installed in the pipe into master cylinder 2. This causes the wheel cylinder pressure to decrease and antiskid control to end. As a result, brake fluid pressure control which reflects the driver's intention is possible.

In TRC control, selector valve 30 is closed. This causes brake fluid drawn by pump 7 from storage chamber 21 to flow to wheel cylinders 10 and 11. This results in the same results as those of the previous embodiment.

Next, a third embodiment of this invention is described below using FIG. 5. The same reference numerals will be used for the structure which provides the same functions as those of the embodiments given so far, and the description of such structure is omitted.

Figure 5:
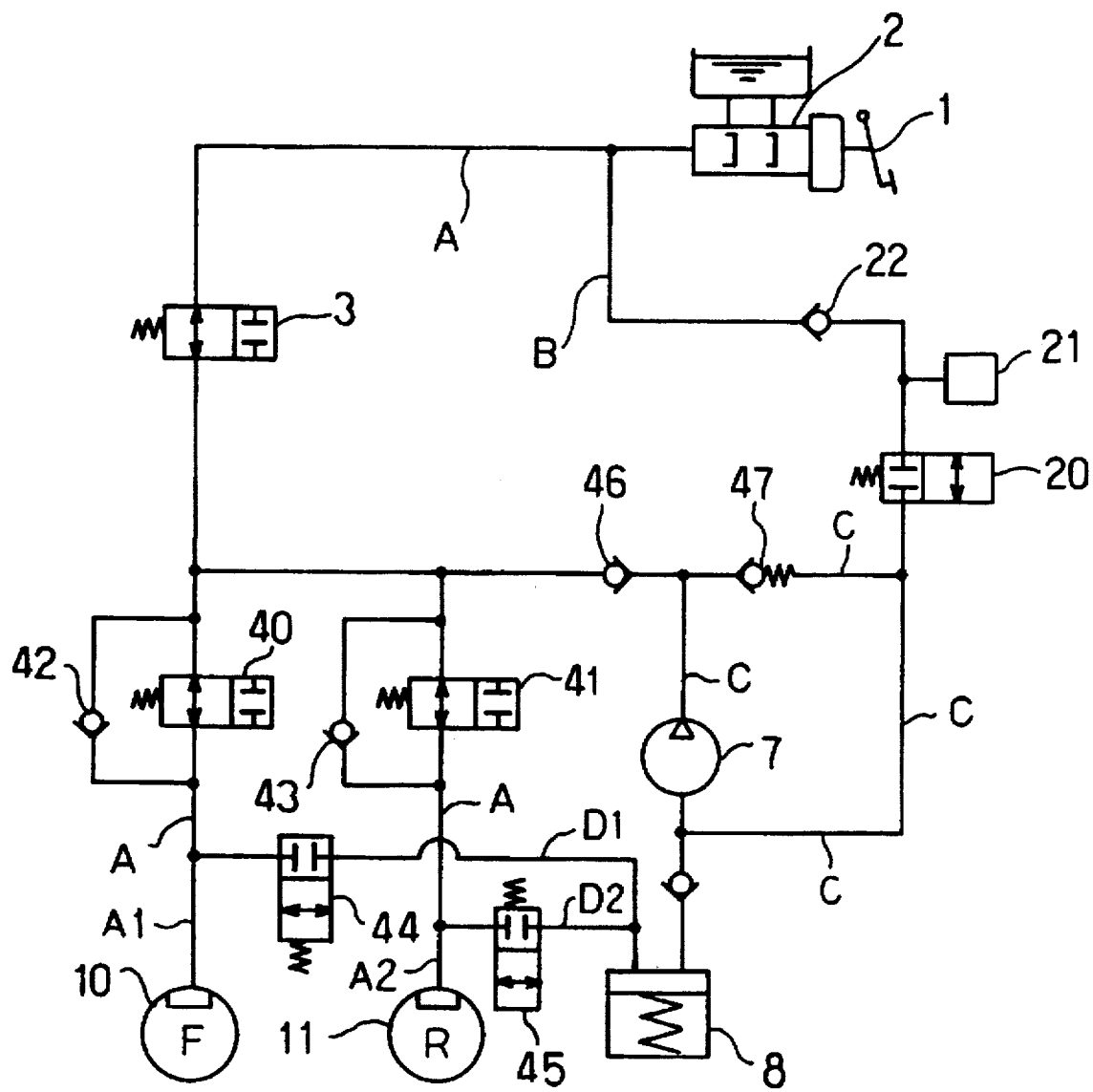
FIG. 5 shows a third preferred embodiment of the present invention.

In FIG. 5, the first control valve 40 is installed in branch pipe A1 of the first brake pipe A, and check valve 42, which allows unidirectional flow of brake fluid from wheel cylinder 10 to master cylinder 2, and is connected in parallel with control valve 40. The second control valve 41 is also installed in the second branch pipe A2, and check valve 43, which allows unidirectional flow of brake fluid from wheel cylinder 11 to master cylinder 2, and is connected in parallel with control valve 41. Furthermore, brake pipe D1 extending from somewhere between the first control valve 40 and first wheel cylinder 10 with its other end connected to reservoir 8, and brake pipe D2 extending from somewhere between the second control valve 41 and second wheel cylinder 11 with its other end connected to reservoir 8, are provided. In brake pipe D1, the third control valve 44 designed to control return of brake fluid from the first wheel cylinder 10 to reservoir 8 is provided, while in brake pipe D2 the fourth control valve 45 designed to control return of brake fluid from the second wheel cylinder 11 to reservoir 8 is provided.

In the pipe extending from the discharge side of pump 7 to the wheel cylinder, check valve 46 which allows, only unidirectional flow of brake fluid from the discharge side of pump 7 to the wheel cylinder is installed. This check valve 46 prevents flow of high-pressure brake fluid from master cylinder 2 to the discharge side of pump 7 during normal braking, which adversely influences pump 7. Differential pressure relief valve 47 is installed in the third brake pipe C at the discharge side of pump 7. This relief valve 47 is designed to open the passage of corresponding third brake pipe C only when brake fluid pressure from the discharge side of pump 7 exceeds a specified level.

Operation of the brake fluid pressure control device of the third embodiment having the above structure is described below.

During normal braking, the ports of each valve are positioned as shown in the figure, and master cylinder pressure from master cylinder 2 is conveyed through first brake pipe A into wheel cylinders 10 and 11.

When antiskid control starts, master pressure cut-off valve 3 is closed to cut off master cylinder pressure. Pump 7 also starts operating following the start of antiskid control and draws brake fluid from reservoir 8 and discharges it to each wheel cylinder. Wheel cylinder pressure of the first wheel cylinder 10 and that of the second wheel cylinder 11 can be controlled in the antiskid control mode shown in TABLE II. For instance, in the case where the pressure of the first wheel cylinder 10 is to be increased and the pressure of the second wheel cylinder 11 is to be maintained, opening the first control valve 40 and closing the third control valve 44 enables the discharge of pump 7 to be applied to the first wheel cylinder 10, and the second control valve 41 and fourth control valve 45 to be closed. In the case where the pressure of the first wheel cylinder 10 is to be decreased and the pressure of the second wheel cylinder 11 is to be increased, closing the first control valve 40 and opening the third control valve 44 enables the brake fluid which has been applied to the first wheel cylinder 10 to be returned to reservoir 8, and opening the second control valve 41 and closing the fourth control valve 45 enables application of pressure of the second wheel 11 cylinder by pump discharge. Moreover, in the case where the pressure of both wheel cylinders is to be decreased, the first and second control valves 40 and 41 are closed, while the third and fourth control valves 44 and 45 are opened. This causes the brake fluid which has been applied to each wheel cylinder to be returned to reservoir 8, thus decreasing the pressure of each wheel cylinder. At this time, the brake fluid pressure discharged from pump 7 is applied through check valve 46 to the first and second control valves 40 and 41; however, it begins to return through the third brake pipe C to reservoir 8 when the pressure inside the pipe at the discharge side of pump 7 exceeds the relief pressure of relief valve 47.

When the driver relaxes the force applied to brake pedal 1 during antiskid control, this action is detected by the control section (not shown in FIG. 5) to open master pressure cut-off valve 3. This causes the brake fluid, which has been exerting pressure on wheel cylinders 10 and 11, to return through check valves 42 and 43 to master cylinder 2. As a result, the pressure of each wheel cylinder is decreased and antiskid control ends to reflect the driver's intention.

Even when TRC control is carried out, control of each wheel cylinder is possible like in the TRC control mode which is shown in TABLE II. In this case, master cut-off valve 3 is closed, while control valve 20 is opened. If pump 7 starts to operate as a result, brake fluid begins to flow out of storage chamber 21 while generating a vacuum in storage chamber 21, thus applying pressure to wheel cylinder 10 or 11. When TRC control comes to an end, the same quantity of brake fluid as that which flowed from storage chamber 21 is drawn and collected into storage chamber 21 due to the vacuum generated in storage chamber 21.

The brake fluid pressure control device having the above structure can provide effects equal to the embodiments described so far.

It is also possible to fill storage chamber 21 used in the previous embodiments with compressible gas or liquid in such a way that it does not leak from storage chamber 21. This causes the above gas or liquid to expand instead of the non-compressible brake fluid, thus generating a vacuum in storage chamber 21. In other words, use of any kind of brake fluid enables more accurate operation of the brake fluid pressure control device, irrespective of the quantity of gas contained in the brake fluid.

In the second brake pipe B, a check valve which allows only unidirectional flow of brake fluid from storage chamber 21 to master cylinder 2 can be installed in parallel with check valve 22. This causes master cylinder pressure to be conveyed to the second brake pipe B when control valve 20 is closed; thus, high-pressure brake fluid can return to master cylinder 2 through the check valve installed in parallel with check valve 22 when master cylinder pressure is reduced, even if brake fluid is seized between check valve 22, storage chamber 21 and control valve 20. This means that seizure of high-pressure brake fluid at the downstream side of check valve 22 in the second brake pipe B can be avoided, thus improving reliability of the brake fluid pressure control device.

With the previous embodiments, a closed-type storage chamber with fixed capacity is used to generate a vacuum in the storage chamber when the brake fluid in the storage chamber is drawn by the pump. However, the elastic force of a spring or the like can be used to generate a vacuum. The volume of the storage chamber decreases according to the quantity of brake fluid drawn by the pump from the storage chamber. Thus, a spring which can accumulate the force to restore the volume of the chamber according to the deformation level of the chamber can be installed in the chamber. In other words, elastic force can be used instead of compressible gas or liquid to generate an apparent vacuum, to cause the storage chamber to accommodate the same quantity of brake fluid as that drawn from the storage chamber by the pump.

Next, a fourth embodiment of this invention is described below using FIG. 6. The same reference numerals will be used for the structure which provides the same operation effect of the previous embodiments, and the description of such structure is omitted. This embodiment describes the structure in which a brake pipe is used for the X-pipe type left front/right rear wheel braking system. The first wheel cylinder 10 is provided for the left front wheel and the second wheel cylinder 11 is provided for the right rear wheel.

Figure 6:
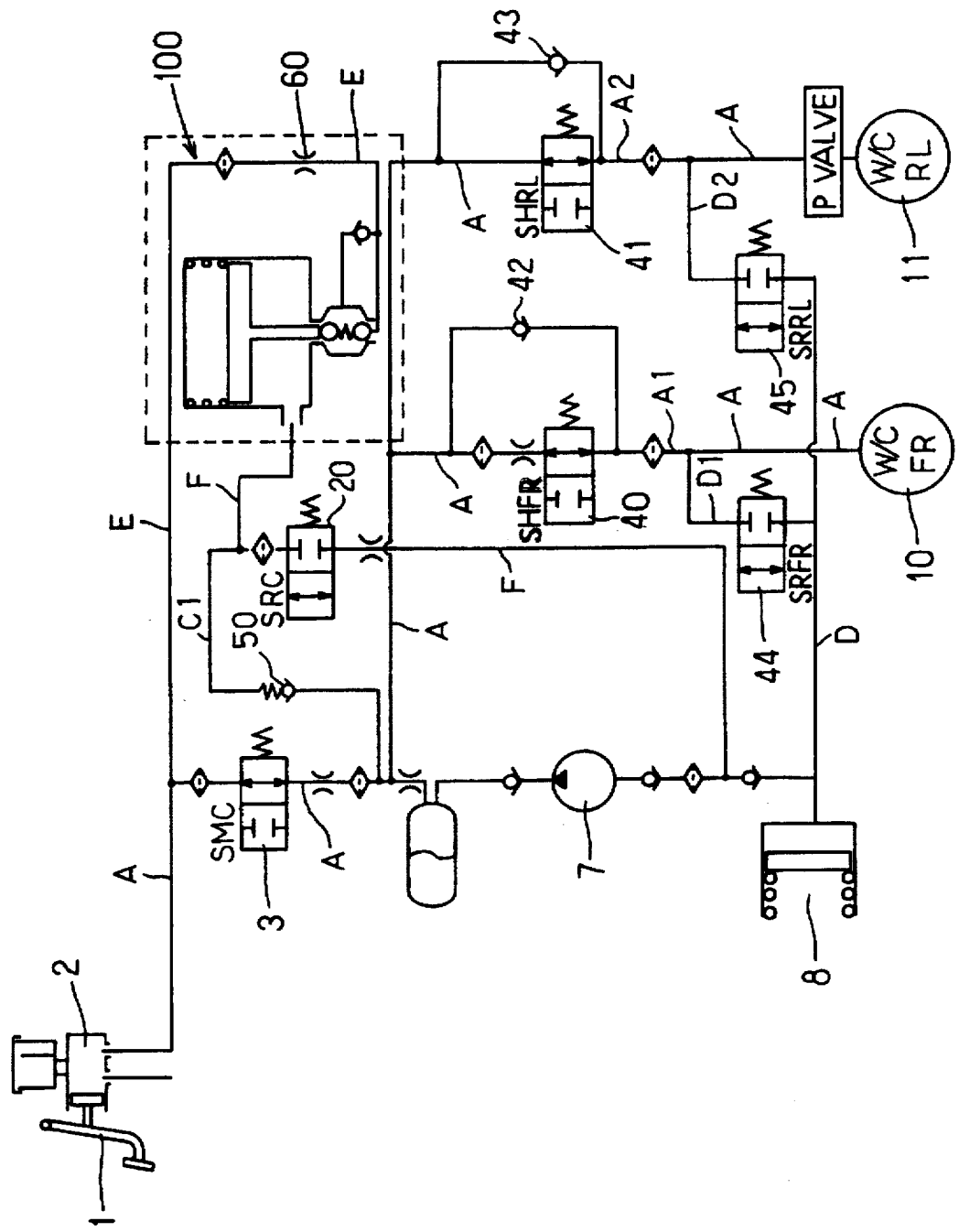
FIG. 6 shows a fourth preferred embodiment of the present invention.

As shown in FIG. 6, the master cylinder pressure which is generated in master cylinder 2 due to a depression of brake pedal 1 is conveyed through the first brake pipe A to wheel cylinders 10 and 11. Master pressure cut-off valve 3 is installed in this first brake pipe A.

Relief valve 50 is connected to the discharge side of pump 7 as well as to brake pipe C1 which is connected to the upstream side of control valve 20, and will be described later. When a specified relief pressure from the discharge side of pump 7 is applied to this relief valve 50, only flow of brake fluid from the discharge side of pump 7 to control valve 20 and tank 110 (explained later in detail) is allowed, thereby protecting the hydraulic circuit elements such as pipes in case of excessive pump discharge pressure. It is also possible to fill tank 110 with brake fluid. Relief valve 50 can be installed by connecting the discharge side of the pump 7 to its suction side using a pipe so that a return passage is formed.

The first control valve 40 is installed in the first branch pipe A1 of the first brake pipe A, and check valve 42 is connected in parallel with this first control valve 40. The second control valve 41 is installed in the second branch pipe A2. Brake pipes D1 and D2 extend from the first and second branch pipes A1 and A2, respectively, and are connected to reservoir 8. The third control valve 44 and fourth control valve 45 are connected to these brake pipes D1 and D2, respectively.

The other end of brake pipe E, whose end is connected to master cylinder 2 through master pressure cut-off valve 3 in the first brake pipe A, is connected to brake fluid storage/supply element 100, which will be described later. The brake pipe F extending from this brake fluid storage/supply element 100 is connected to the pipe located at the same level as the suction side of pump 7. Control valve 20, which opens and closes brake pipe F, is connected to this brake pipe F.

A detailed description of the structure of brake fluid storage/supply element 100 is given below using FIG. 7.

Brake fluid storage/supply element 100 consists of tank 110, where brake fluid is stored, and pipe 111 which extends from tank 110 and has disk-like valve seats 112 and 113. This pipe 111 having valve seats 112 and 113 is used to control storage and supply of brake fluid from master cylinder 2 to tank 110. Spring 101, piston 102 and tamping rod 103 interlocked with piston 102 are built into tank 110. The other end of tamping rod 103 is constructed so that it can be inserted through disk-like valve seat 112 into pipe 111. The diameter of the first ball 104, which can contact rod 103, is smaller than that of pipe 111 by a specified value. The second ball 106 is installed on brake pipe E, and spring 105 designed to apply a force against each ball is provided between the first and second balls 104 and 106, which act as a valve needle. If first ball 104 comes into contact with disk-like valve seat 112, flow of brake fluid in pipe 111 is prohibited. Furthermore, flow of brake fluid in pipe 111 is also prohibited if the second ball 106 comes into contact with disk-like valve seat 113. The tamping rod controls seating of first ball 104 against valve seat 112 according to the quantity of brake fluid in tank 110. The first and second balls 104 and 106 are used as a valve needle, and provide a double-check mechanism using pipe 111, first and second balls 104, 106 and spring 105.

TRC control is described. When pump 7 begins to operate as result of the start of TRC control, a vacuum is exerted on brake pipe F. During this stage, master pressure cut-off valve 3 is closed, while control valve 20 is opened. Thus, the vacuum generated by pump 7 is conveyed to tank 110, causing piston 102 to move downwards and brake fluid to flow. As the brake fluid flowing in this way is discharged by pump 7, wheel cylinder pressure is applied. If the spring constant of spring 105 is set so that it exceeds the vacuum generated by pump 7, the second ball 106 is kept in contact with valve seat 113 if no master cylinder pressure is present. Thus, it becomes possible to apply pressure to wheel cylinders 10 and 11 using brake fluid present in tank 110 without drawing brake fluid from master cylinder 2. During TRC control mode, control can be carried out in the same way as the previous embodiments; thus, wheel cylinders can be controlled independently.

TABLE III

| Mode | | Pump Mode | SMC 3 | SRC 20 | SH FR | SH RL | SR FR | SR RL | Path 1 | Path 2 | Piston | Oil Flow | |
|---|---|---|---|---|---|---|---|---|---|---|---|---|---|
| Norm. | Tank ½ Full | Off | O | C | O | O | C | C | O | O | Increase | Valve E → Route a → Route b | Valve A ↓ W/C |
| | Tank Full | Off | O | C | O | O | C | C | C | O | Stop | — | |
| TRC | Poor Br. | On | C | O | O | C | C | C | O | C | Decline | Tank→Valve F→C→A→W/C | |
| | | On | C | O | C | C | O | C | O→C | C | Increase | W/C→C→F→Tank | |
| | Good Br. | On | C | O | O | C | C | C | O | O | *Note 1 | M/C→A→E→F→C→A'→W/C | |
| | | On | C | O | C | O | O | C | O | O | Increase | W/C→D→F→Tank→ E→A→M/C | |

*Note 1 — Depends on Water Pressure and Oil Consumption

Operation of the brake fluid pressure control device having the above structure is described below using TABLE III below.

First, operation of brake fluid storage/supply element 100 during braking is described below. During braking, the port of each valve is positioned as shown in the figure. The brake fluid from master cylinder 2 flows to wheel cylinders 10 and 11 through the first brake pipe A, and also flows to tank 110 through brake pipe E. At this time, if tank 110 is empty or almost empty, the second ball 106 is pushed upwards by brake fluid flowing through brake pipe E and the brake fluid enters tank 110, thus moving piston 102 upwards to cause brake fluid to flow into tank 110 until the tank is full; that is, when the first ball 104 is seated on valve seat 112. If tank is full from the beginning, brake fluid will not flow into the tank 110, since the first ball 104 is already seated on valve seat 112. In this way, each time master cylinder pressure is generated due to depression of brake pedal 1, a certain quantity of brake fluid is stored in tank 110 until the tank 110 is almost filled with brake fluid. Tank 110 having capacity of a few cubic centimeters is sufficient.

When antiskid control is executed, master pressure cut-off valve 3 is closed and the same antiskid control mode as that of the previous embodiments is executed to control the pressure of each wheel cylinder. Control valve 20 is kept closed, and pump 7 discharges brake fluid which has been drawn from reservoir 8.

Next, operation of brake fluid storage/supply element 100 during TRC control is described below. First, the condition in which the driver is not depressing brake pedal 1 during Next, operation of brake fluid storage/supply element 100 when master cylinder pressure is generated as a result of depression of brake pedal 1 made by the driver because he notices that the wheels are slipping during TRC control is described below. If, for example, master cylinder pressure exceeds atmospheric pressure level, brake fluid pressure from brake pipe E is applied to the second ball 106, causing the ball to move away from valve seat 113. Piston 102 is in descent due to vacuum generated by pump 7, and the first ball 104 is not in contact with valve seat 112 since it is pushed by tamping bar 103. Thus, the brake fluid from brake pipe E immediately flows into tank 110 and towards brake pipe F, thereby enabling smooth depression of brake pedal 1. After brake fluid from master cylinder 2 flows into tank 110 until the tank is nearly filled, piston 102 begins to move upwards, thereby causing supply of brake fluid from master cylinder 2 into the tank 110 to stop. This means that only the specified quantity of brake fluid is stored in tank 110 according to depression of the brake pedal 1. Normally, when the brake pedal 1 is depressed during TRC control, TRC control ends after the depression is detected by the specified method. The vehicle is returned to the normal braking condition, but control valve 20, for instance, is closed after a specified delay. Thus, pump 7 will not excessively draw brake fluid flowing into tank 110 due to depression of the brake pedal 1. Moreover, the specified quantity of brake fluid flowing from the master cylinder 2 during the control delay is stored in tank 110, and master pressure cut-off valve 3 is closed and the vehicle returns to the normal braking condition after elapse of the equivalent control delay. In this way, brake fluid flows out of master cylinder 2 when brake pedal 1 is depressed during TRC control;

however, only the same quantity of brake fluid as that originally present in tank 110 enters tank 110. Thus, the quantity of brake fluid to be returned to master cylinder 2 at the end of TRC control matches that which flowed into the wheel cylinder from master cylinder 2 due to depression of brake pedal 1. Thus, with the brake fluid pressure control device using brake fluid storage/supply element 100, the same results as those of the previous embodiments can be achieved.

Since constriction 60 is provided on brake pipe E, it is possible to memorize the feeling of pressure in depression of brake pedal 1 during TRC control; thus, braking can be further improved. Moreover, a pipe is provided to connect brake pipe E to a point between first and second balls 104 and 106 of pipe 111, and check valve 107, which allows only unidirectional flow of brake fluid from pipe 111 to brake pipe E, is installed in the above pipe. Installing a pipe and check valve 107 in this way can prevent seizure of high-pressure brake fluid inside balls 104 and 106.

Figure 8:
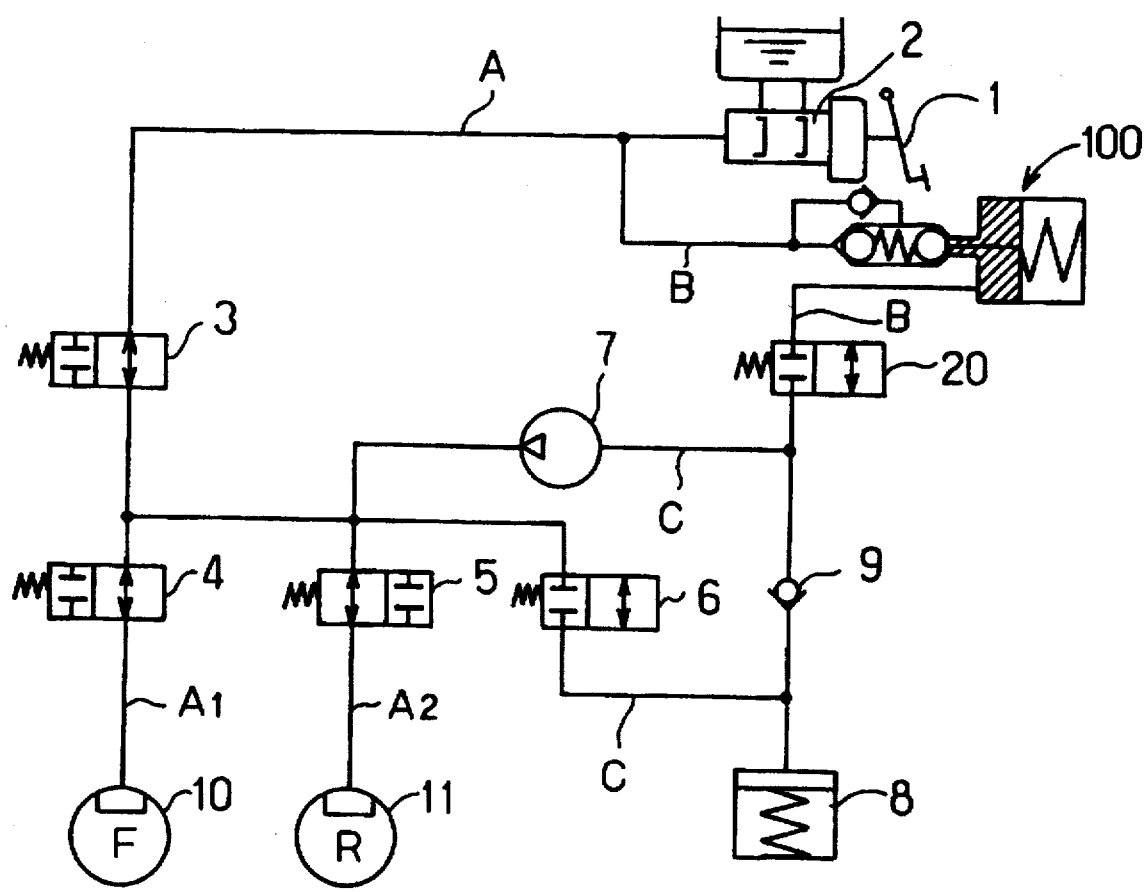
FIG. 8 shows a first modified example of the fourth embodiment.

The brake fluid pressure control device shown in FIG. 8 is the first modified example of the fourth embodiment of this invention. In this modification, brake fluid storage/supply element 100 is installed in the device shown FIG. 1. Storage chamber 21 and check valve 22 connected to the second brake pipe B in FIG. 1 are eliminated and a brake fluid storage/supply element is installed instead.

Figure 9:
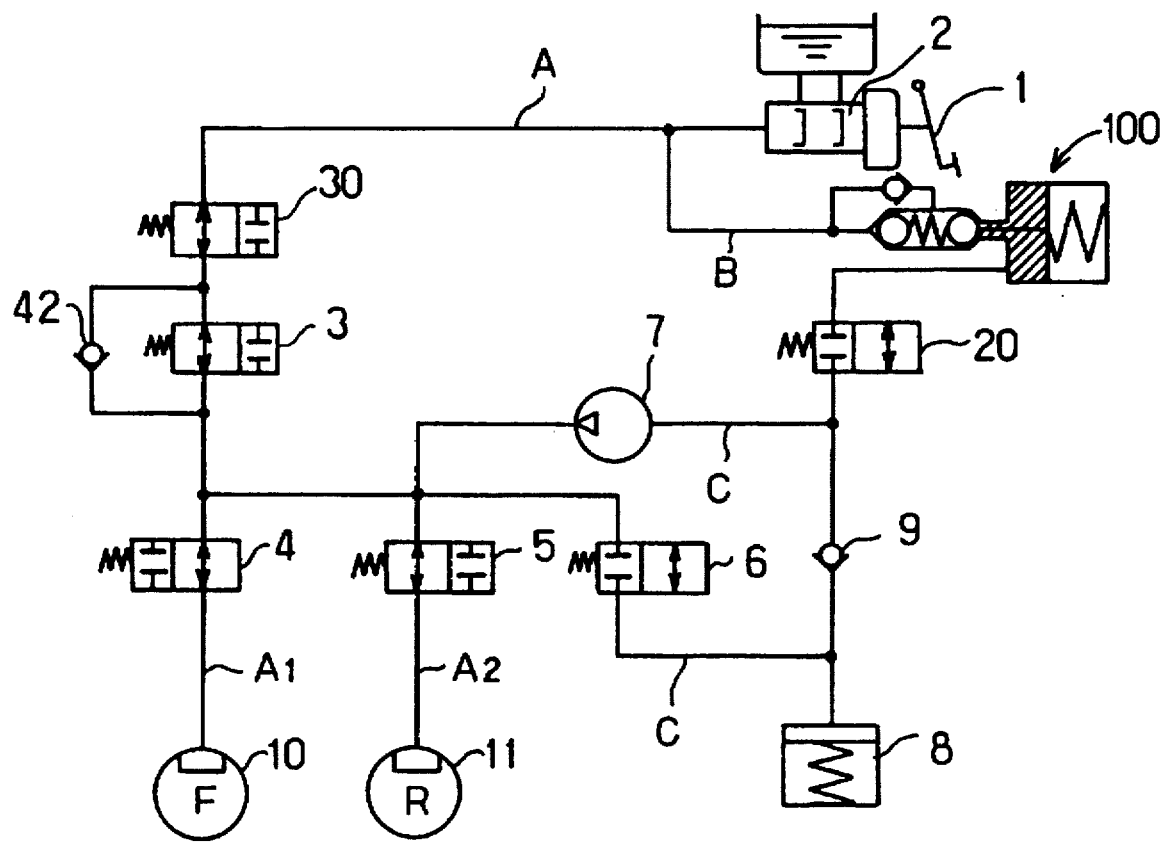
FIG. 9 shows a second modified example of the fourth embodiment.

The brake fluid pressure control device shown in FIG. 9 is the second modified example of the fourth embodiment. In this modification, brake fluid storage/supply element 100 is installed in the device shown in FIG. 2. Storage chamber 21 and check valve 22 connected to the second brake pipe B in FIG. 2 are eliminated and a brake fluid storage/supply element is installed instead.

Figure 10:
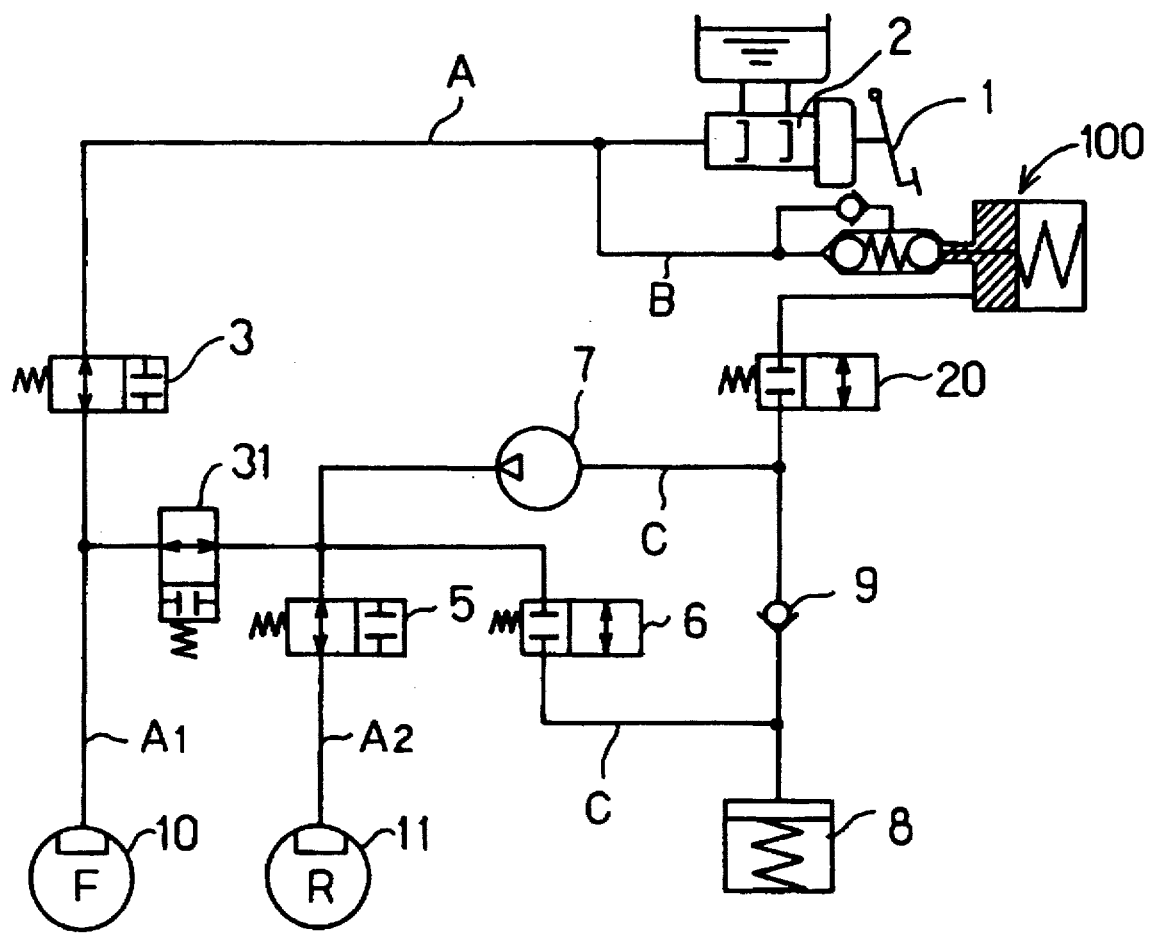
FIG. 10 shows a third modified example of the fourth embodiment.

The brake fluid pressure control device shown in FIG. 10 is a third modified example of the fourth embodiment. In this modification, brake fluid storage/storage/supply element 100 is installed in the device shown in FIG. 3. Storage chamber 21 and check valve 22 connected to the second brake pipe B in FIG. 3 are eliminated and a brake fluid storage/storage/supply element 100 is installed instead.

Figure 11:
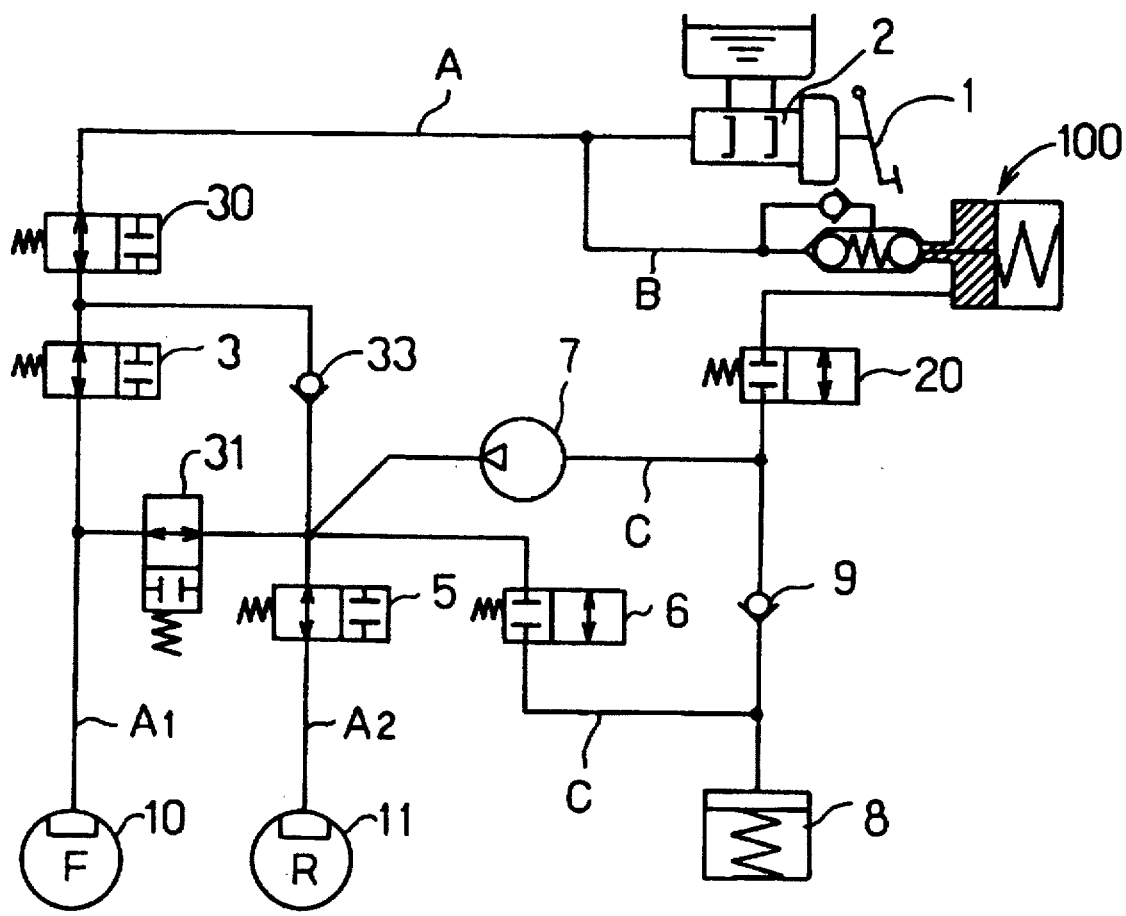
FIG. 11 shows a fourth modified example of the fourth embodiment.

The brake fluid pressure control device shown in FIG. 11 is a fourth modified example of the fourth embodiment. In this modification, brake fluid storage/storage/supply element 100 is installed in the device shown in FIG. 4. Storage chamber 21 and check valve 22 connected to the second brake pipe B in FIG. 4 are eliminated and a brake fluid storage/storage/supply element 100 is installed instead.

In this way, with modified examples of the fourth embodiment, the same result as that obtained with the previous embodiments can be obtained.

This invention is not limited to the above embodiments, and it can be modified as follows.

Figure 12:
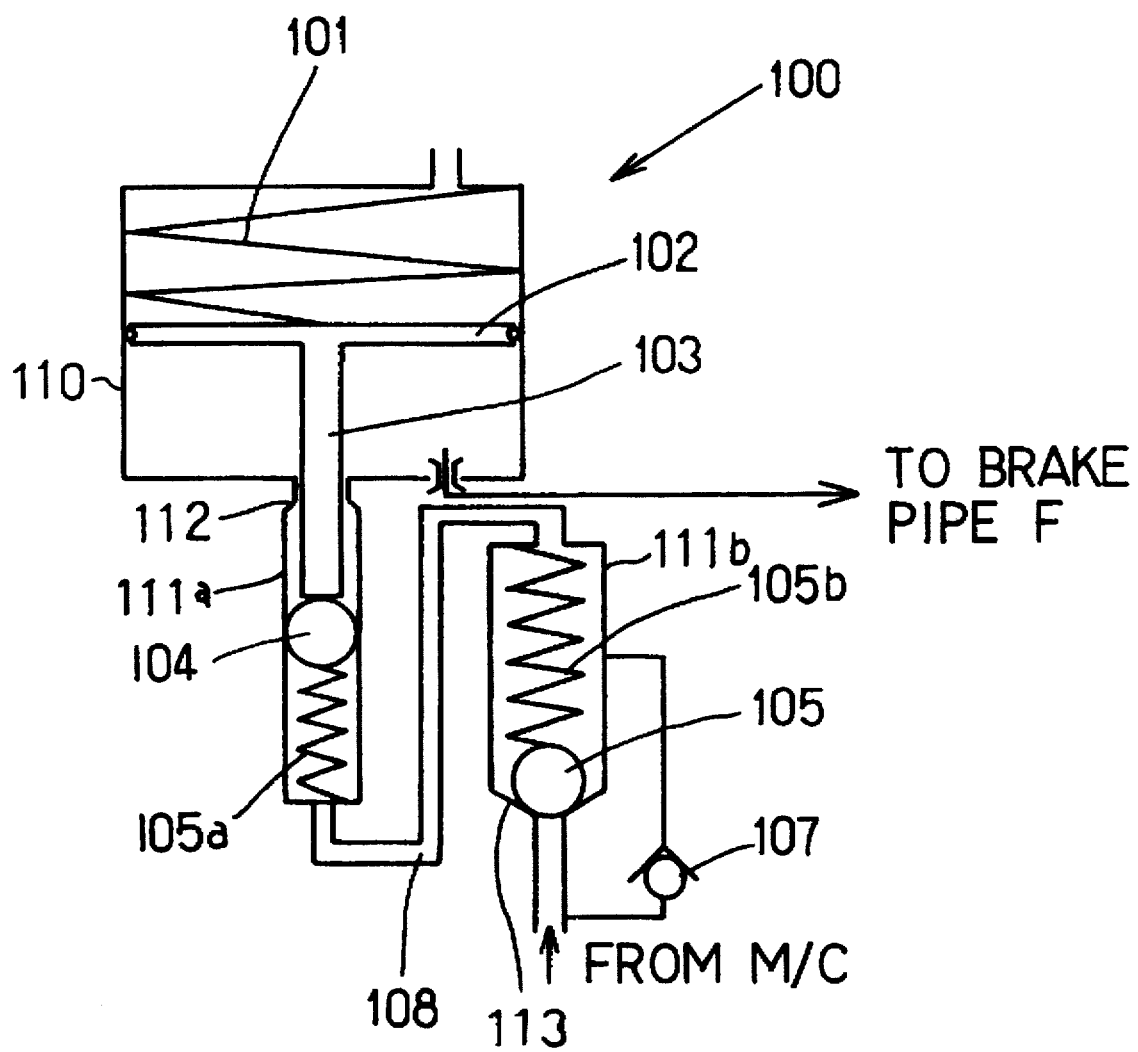
FIG. 12 shows a modified example of the brake fluid storage/supply element.
Figure 13:
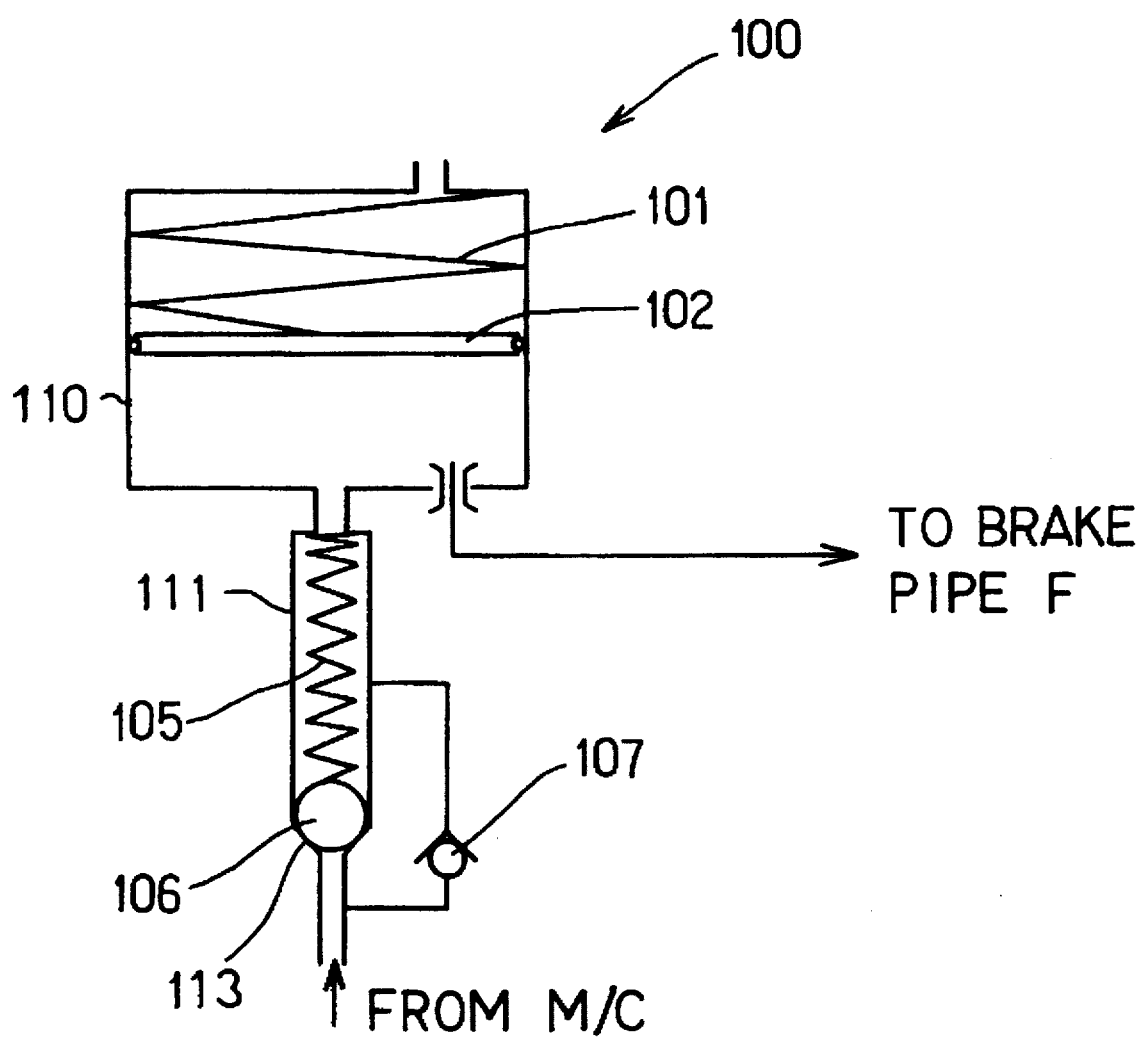
FIG. 13 shows another modified example of the brake fluid storage/supply element.
Figure 14:
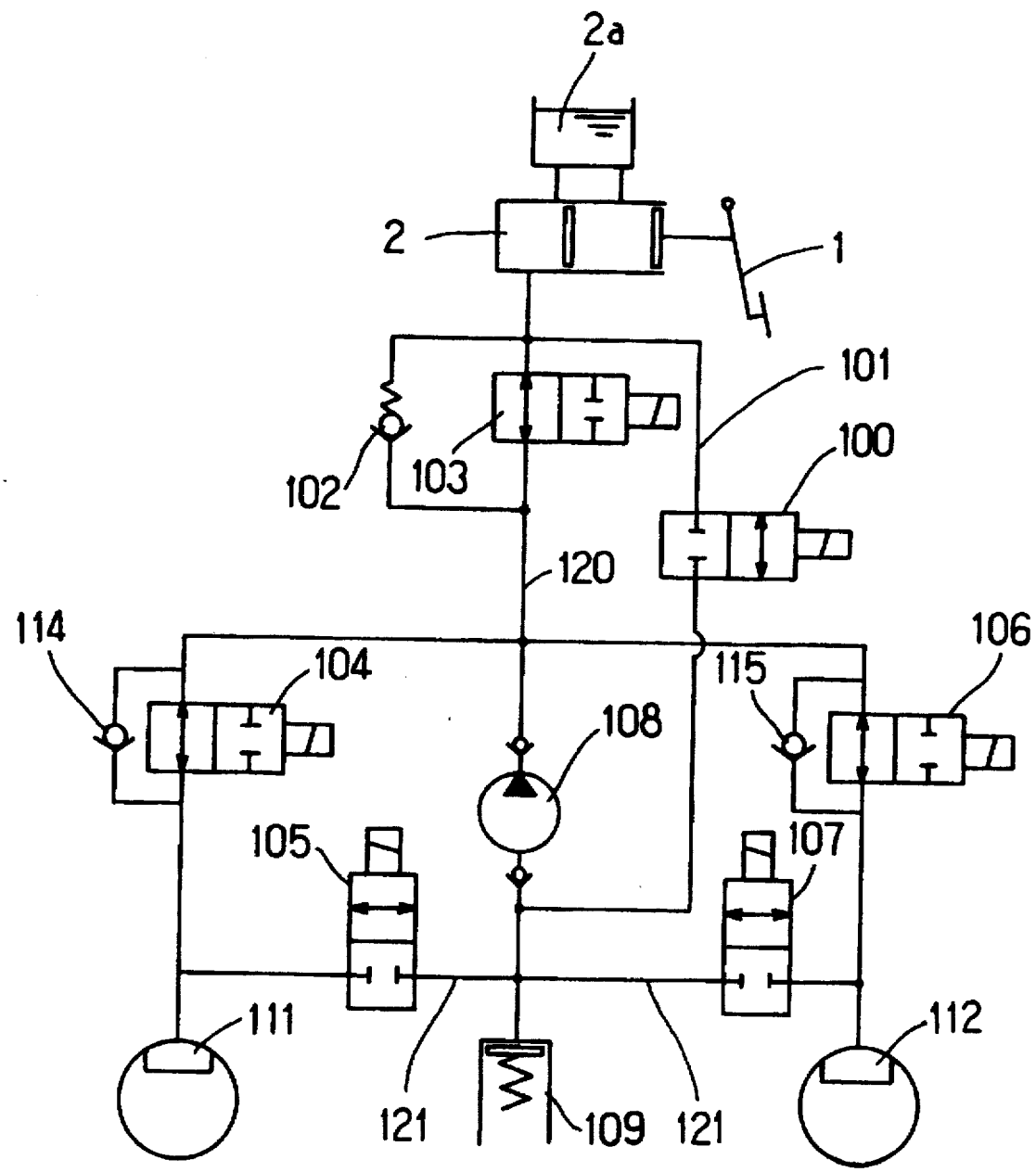
FIG. 14 shows a hydraulic circuit according to the prior art.

For instance, brake fluid storage/storage/supply element 100 of the fourth embodiment can be modified as shown in FIG. 12 or FIG. 13.

Figure 7:
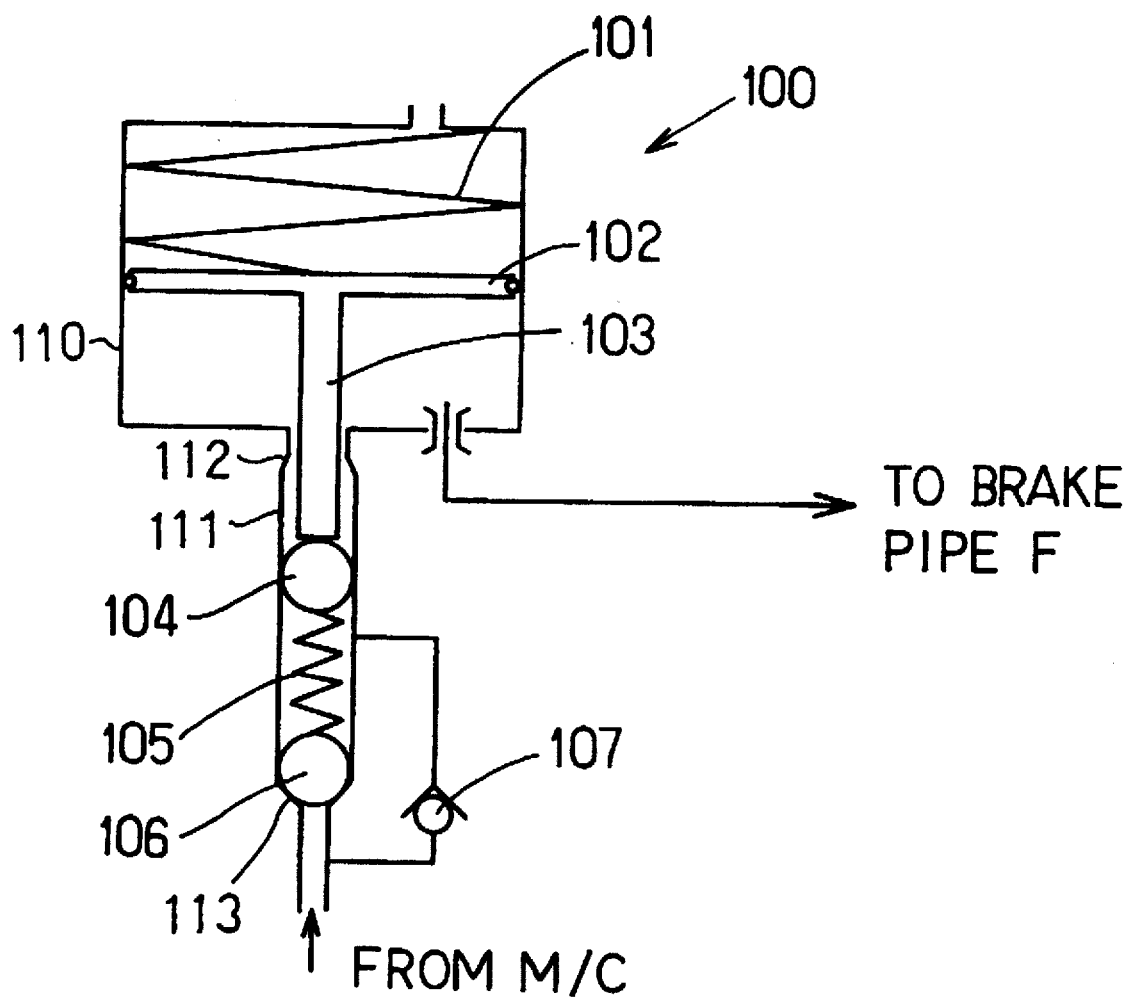
FIG. 7 shows a brake fluid storage/supply element used in the fourth embodiment.

As shown in FIG. 12, pipe 111 for brake fluid storage/supply element 100 shown in FIG. 7 is divided to form pipes 111a and 111b, which are then connected to pipe 108. Spring 105 of brake fluid storage/supply element 100 shown in FIG. 7 is also divided to form springs 105a and 105b. The spring constant of spring 105b is set above the vacuum generated by suction of the pump. Moreover, the spring constant of spring 105b is set so that tamping bar 103 can push the first ball 104 downward when piston 102 moves downward due to suction of pump 7. Thus, a brake fluid pressure control device equipped with brake fluid storage/supply element 100 can still provide the same result as the previous embodiment.

Moreover, brake fluid storage/supply element 100 can be simplified as shown in FIG. 13. With brake fluid storage/supply element 100 of the previous embodiments, the first and second balls 104 and 106 are used to provide a double-check mechanism to control flow of brake fluid into tank 110. However, with this example in which the first ball 104 and tamping bar 103 are eliminated, the same result as the previous embodiments can still be obtained. In other words, if the spring constant of spring 105 is set above the vacuum generated by pump 7, flow of brake fluid from master cylinder 2 to tank 110 is prohibited since pipe 111 is closed if master cylinder pressure is not applied to the second ball 106 during TRC control. Thus, pump 7 draws only the brake fluid which has been stored in tank 110 and applies pressure to the wheel cylinder. Moreover, when brake pedal 1 is depressed during TRC control, the second ball 106 moves away from valve seat 113, causing brake fluid to flow into tank 110. As a result, depression of brake pedal 1 becomes smooth. During normal braking, brake fluid flows into tank 110 from master cylinder 2 until tank 110 is full. Since a load caused by brake fluid pressure is expected to be exerted to tank 110 or control valve 20 when tank 110 is full, control valve 20 and tank 110 can be thus reinforced. In this way, when master cylinder pressure is generated, tank 110 is almost filled with brake fluid, which is then used to execute TRC control. As a result, the same result as the previous embodiment can be obtained. It is also possible to restrict the stroke of piston 102 by installing a stopper in tank 110. This reduces the possibility of deterioration of elasticity of spring 101 which has low spring force, thus providing good operation.

In the above embodiment, TRC control and antiskid control are used as brake fluid pressure control method carried out by pressure rise/drop control method. However, this invention can be applied to vehicle control so that wheel cylinder pressure is applied even if the brake pedal is not depressed, to improve tractability during turning of the vehicle. Furthermore, this invention can be applied to a system in which the pressure rise/drop control method carries out traction control only.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A brake fluid pressure control system which controls brake fluid pressure exerted on a wheel cylinder of a wheel of a vehicle, said system comprising:

a hydraulic power source which provides brake fluid pressure to said wheel cylinder responsive to depression of a brake pedal;

a first brake pipe which transfers brake fluid pressure from said hydraulic power source to said wheel cylinder;

pressure control means for controlling increase and decrease of brake fluid pressure applied to said wheel cylinder when said brake pedal is not pressed;

prohibitive means for prohibiting flow of brake fluid between said hydraulic power source and said wheel cylinder of said first brake pipe when brake fluid pressure is controlled by said pressure control means;

a pump which discharges brake fluid to said first brake pipe to add brake fluid pressure to said wheel cylinder when brake fluid pressure is controlled by said pressure control means;

a second brake pipe connected between a suction side of said pump and said hydraulic power source;

a fluid storage chamber, filled with a gas or fluid which expands and generates a vacuum when brake fluid stored in said fluid storage chamber flows therefrom, which is connected to second brake pipe and sealed up so that it generates a vacuum when brake fluid is drawn as said pump operates;

a brake fluid storage-supply control means for permitting a flow of brake fluid between said hydraulic power source and said fluid storage chamber when brake fluid pressure is generated from said hydraulic power source of said second brake pipe, and for prohibiting a flow of brake fluid between said hydraulic power source and said suction side of said pump when no brake fluid pressure is generated from said hydraulic power source; and a control valve which controls connection between said fluid storage chamber and said suction side of said pump and shuts off flow of brake fluid from said storage chamber to said suction side of said pump when control of brake fluid pressure is not carried out by said pressure control means.

2. A brake fluid pressure control system as claimed in claim 1, in which a capacity of said fluid storage chamber is fixed to generate said vacuum.

3. A brake fluid pressure control system as claimed in claim 2, in which said brake fluid storage-supply control means is implemented closer to said hydraulic power source side than said storage chamber of said second brake pipe, and is comprised of a check valve which permits a flow of brake fluid only from said hydraulic power source side to said suction side of said pump.

4. A brake fluid pressure control system as claimed in claim 3, in which said pressure control means also includes anti-skid control means to control increase and decrease of brake fluid pressure exerted on said wheel cylinder during braking slip caused as result of depression of a brake pedal, and said control valve intercepts a flow of brake fluid from said storage chamber to said suction side of said pump even if said pressure control means is controlling increase and decrease of brake fluid pressure by said anti-skid control means during braking slip.

5. A brake fluid pressure control system as claimed in claim 1, in which said brake fluid storage-supply control means is implemented closer to said hydraulic power source side than said storage chamber of said second brake pipe, and is comprised of a check valve which permits a flow of brake fluid only from said hydraulic power source side to said suction side of said pump.

6. A brake fluid pressure control system as claimed in claim 5, in which said pressure control means also includes anti-skid control means to control increase and decrease of brake fluid pressure exerted on said wheel cylinder during braking slip caused as result of depression of a brake pedal, and said control valve intercepts a flow of brake fluid from said storage chamber to said suction side of said pump even if said pressure control means is controlling increase and decrease of brake fluid pressure by said anti-skid control means during braking slip.

7. A brake fluid pressure control system as claimed in claim 1, in which said pressure control means also includes anti-skid control means to control increase and decrease of brake fluid pressure exerted on said wheel cylinder during braking slip caused as result of depression of a brake pedal, and said control valve intercepts a flow of brake fluid from said storage chamber to said suction side of said pump even if said pressure control means is controlling increase and decrease of brake fluid pressure by said anti-skid control means during braking slip.

* * * * *